United States Patent [19]
Kondo et al.

[11] Patent Number: 5,494,151
[45] Date of Patent: Feb. 27, 1996

[54] VIBRATORY PARTS-FEEDER APPARATUS

[75] Inventors: Hiroyuki Kondo; Kazumichi Kato, both of Ise, Japan

[73] Assignee: Shinko Electric Co., Ltd., Tokyo, Japan

[21] Appl. No.: 285,227

[22] Filed: Aug. 3, 1994

[30] Foreign Application Priority Data

| Aug. 6, 1993 | [JP] | Japan | 5-215119 |
| Nov. 30, 1993 | [JP] | Japan | 5-326199 |
| Dec. 2, 1993 | [JP] | Japan | 5-338904 |
| Apr. 21, 1994 | [JP] | Japan | 6-107700 |

[51] Int. Cl.$^6$ ............................. B65G 27/02
[52] U.S. Cl. ............................. 198/757; 198/756
[58] Field of Search ............................. 198/752, 756, 198/757, 759, 760, 860.3

[56] References Cited

U.S. PATENT DOCUMENTS

| 3,613,869 | 10/1971 | Schuricht | 198/756 X |
| 3,826,870 | 7/1974 | Wurm et al. | 179/1 P |
| 3,960,237 | 6/1976 | Sleeper | 181/33 |
| 4,245,737 | 1/1981 | Pellerin et al. | 198/756 |

FOREIGN PATENT DOCUMENTS

| 0227372 | 7/1987 | European Pat. Off. | |
| 4246008 | 9/1992 | Japan | 198/757 |
| WO9217936 | 10/1992 | WIPO | |

OTHER PUBLICATIONS

WO-A-89 07701 (Noise Cancellation Technologies, Inc.).
Patent Abstracts of Japan vol. 11, No. 316 (M-631) 15 Oct. 1987 & JP-A-62 100 311 (MEIJI ENG KK) 9 May 1987.
GB-A-2 204 916 (British Gas PLC) WO-A-92 17936 (Applied Acoustic Research).

Primary Examiner—James R. Bidwell
Attorney, Agent, or Firm—Carothers & Carothers

[57] ABSTRACT

A vibratory parts-feeder apparatus includes a vibratory parts-feeder, a surrounding device for surrounding the vibratory parts-feeder, a sound-wave generator arranged below the vibratory parts-feeder, a noise detector arranged near the vibratory parts-feeder or attached thereto for detecting noise generating from the vibratory parts-feeder, a noise-cancelling signal generator, receiving the detecting output of the noise detector and driving the sound-wave generator; whereby sound-waves generating from the sound-wave generator are transmitted outwards from an annular gap at the upper end of the surrounding device, the surrounding device consists of a first cylindrical body with a bottom, surrounding the vibratory parts-feeder and a second cylindrical body, with a bottom, surrounding the first cylindrical body, the sound-wave generator is arranged at an opening made in the bottom of the second cylindrical body, and sound-waves generating from said sound-wave generator are transmitted outwards from an annular gap between the upper ends of the first and second cylindrical bodies.

26 Claims, 22 Drawing Sheets

VIBRATORY PARTS-FEEDER APPARATUS

BACKGROUND OF THE INVENTION

1. Field of the Invention

This invention relates to a vibratory parts-feeder apparatus and more particularly to a vibratory parts-feeder apparatus in which noises generated from a vibratory parts-feeder can be cancelled.

2. Description of the Prior Art

FIG. 1 shows a Prior Art vibratory parts-feeder and it is generally denoted by a reference numeral 1. A spiral track is formed on the inner surface of a bowl 2. It is nearly circular in plan view. The bowl 2 is combined with a base block 3 by plural leaf springs 5 obliquely arranged at regular angular intervals. A movable core 4 is fixed at the bottom of the bowl 2. It is facing to an electro-magnet 7 spacing by a gap g. When an electro-magnetic coil 6 wound on the electro-magnet 7 is energized by alternating current, an alternating magnetic attracting force is generated between the movable core 4 and electro-magnet 7. Thus, the bowl 2 is tortionally vibrated in a well-known manner. The base block 3 is supported by rubber springs 8 which function to prevent vibrational force from transmitting to the ground S. The rubber spring 8 is fixed at the ground S through a fixing plate 9 by a bolt.

A torsional vibratory force generator is composed of the movable core 4, the electro-magnet 7, the electro-magnetic coil 6 and the leaf springs 5. The whole of the torsional vibratory generator is covered by a cylindrical cover member 10. The above described vibratory parts-feeder 1 widely used to supply different parts to a next stage desired posture. Recently, small parts such as semi-conductor device and electronic part are widely handled by the vibratory parts-feeder 1. The size of the part is, for example, 1 mm×2 mm×0.5 mm. It is difficult to obtain a satisfactory orientating function at the commercial electric source frequency supply of 50 Hz or 60 Hz. Accordingly, a driving frequency of the electric-magnetic coil is increased to a higher frequency such as 100 Hz, while an amplitude of this bowl is smaller. The small parts can be sufficiently orientated. However, the level of the sound generated from the vibratory parts-feeder driven by the high-frequency is very high and the sound is jarring. It is a public nuisance to the neighborhood.

SUMMARY OF THE INVENTION

Accordingly, it is an object of this invention to provide a vibratory parts-feeder apparatus from which noise can be prevented from transmitting outwards. In accordance with an aspect of this invention, A vibratory parts-feeder apparatus comprising:
(A) a vibratory parts-feeder;
(B) surrounding means for surrounding said vibratory parts-feeder;
(c) sound-wave generating means arranged below said vibratory parts-feeder;
(D) noise detecting means arranged near said vibratory parts-feeder or attached thereto for detecting noise generating from said vibratory parts-feeder;
(E) a noise-cancelling signal generator, receiving the detecting output of said noise detecting means and driving said sound-wave generating means; whereby sound-waves generating from said sound-wave generating means are transmitted outwards from an annular gap at the upper end of said surrounding means. In accordance with another aspect of this invention, A vibratory parts-feeder apparatus comprising:
(A) a vibratory parts-feeder comprising:
  (a) a bowl in which a spiral track is formed;
  (b) a base block which is arranged under said bowl;
  (c) an electro-magnet with a wound coil, fixed to said base block; and
  (d) spring means combining said bowl and said base block;
(B) sound-wave generating means arranged at a first opening made in a center of said base block;
(C) a sound duct fixed at a margin of the first opening of said base block, extending upwards and facing at its upper end to a second opening made in a center of the bottom of said bowl;
(D) noise detecting means arranged near said vibratory parts-feeder or attached thereto for detecting noise generating from said vibratory parts-feeder, and
(E) a noise-cancelling signal generator, receiving the detecting output of said noise detecting means and driving said sound-wave generating means, whereby sound-waves generating from said sound-wave generating means are transmitted outwards through said sound duct.

The foregoing and other objects, features, and advantages of the present invention will be more readily understood upon consiseration of the following detailed description of the preferred embodiments of the invention, taken in conjunction with the accompaning drauings.

DESCRIPTION OF THE PREFERRED EMBODIMENTS

Next, vibratory parts-feeder apparatus according to embodiments of this invention will be described with reference to the drawings.

Figure 1:
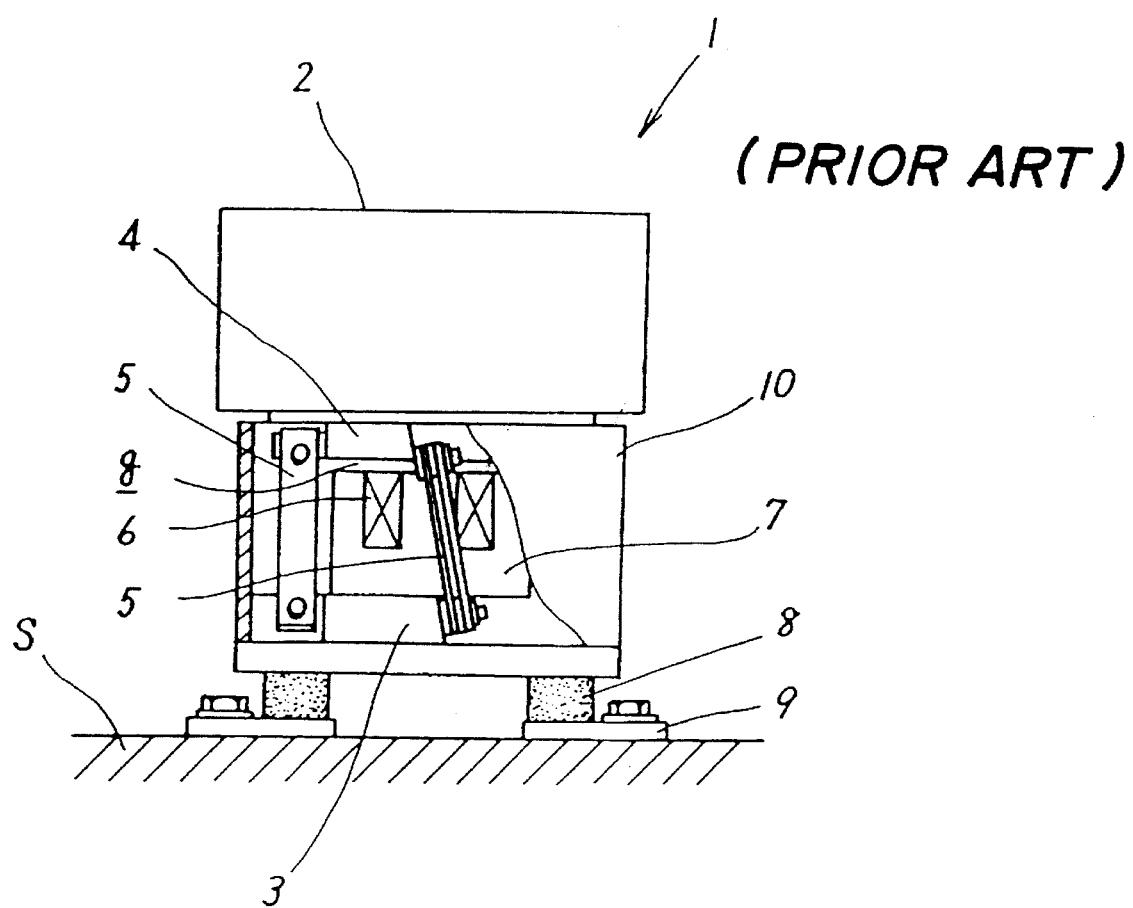
FIG. 1 is a parially broken-away cross-sectional view of the vibrating parts-feeder of Prior Art.
Figure 2:
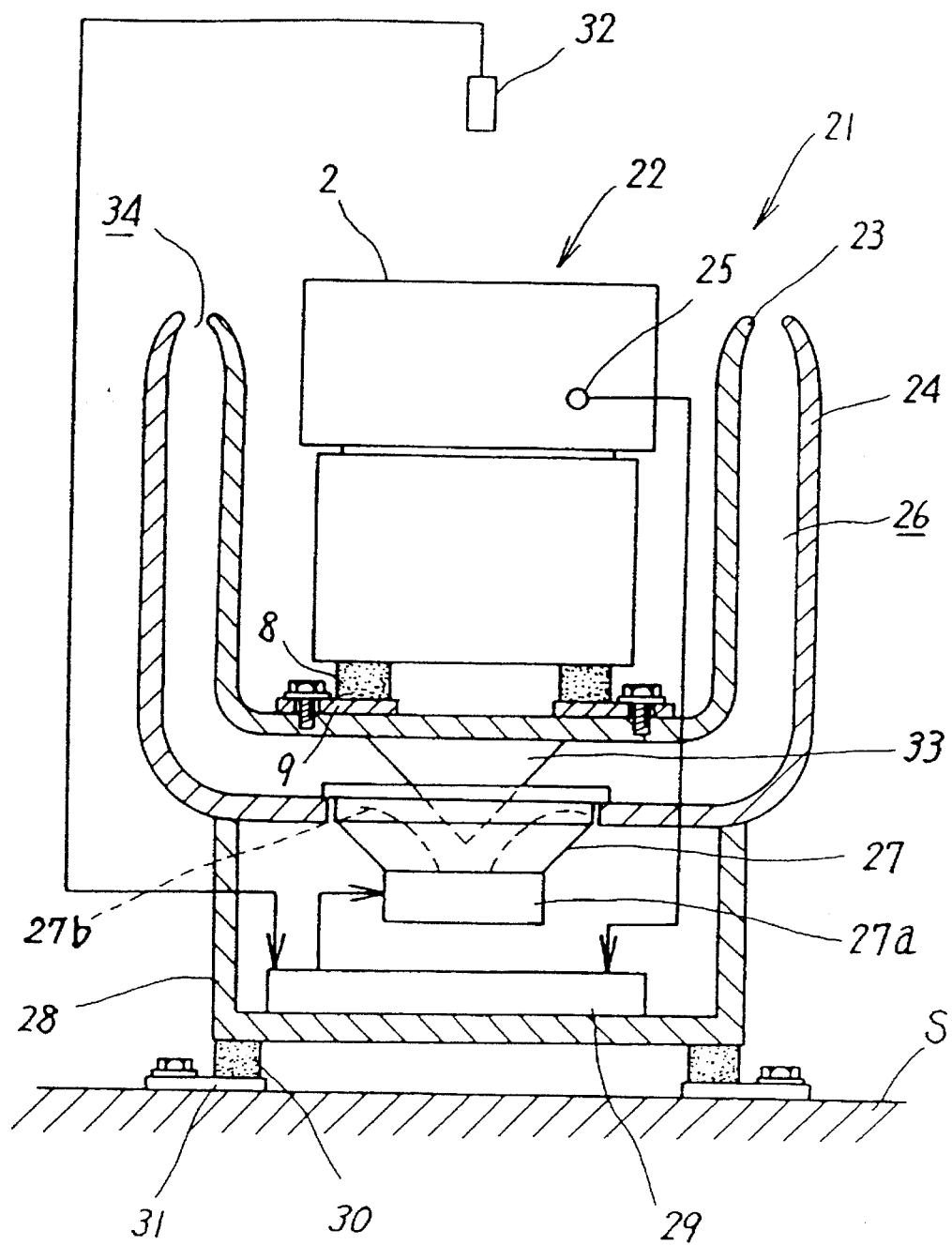
FIG. 2 is a cross-sectional view of a vibratory parts-feeder apparatus according to a first embodiment of this invention.

FIG. 2 shows a vibratory parts-feeder apparatus 21 according to a first embodiment of this invention and it is generally denoted by a reference numeral 21. Since the vibratory parts-feeder 22 as a noise generating source has the same construction as the Prior Art parts-feeder 1, the parts which correspond to those in the Prior Art, are denoted by the same reference numerals, the description of which will be omitted.

A rubber spring 8 attached to the bottom of the vibratory parts-feeder 22 is fixed to a bottom of a first cylindrical member 23 with bottom, which surrounds the vibratory parts-feeder 22. As well-known, the bowl 2 of the vibratory parts-feeder 2 is nearly circular in plan view. The cylindrical member 23 with bottom is arranged concentrically with the bowl 2. A second cylindrical member 24 with bottom is arranged concentrically with the first cylindrical member 23 with bottom, spacing a predetermined distance from each other. The upper end of the first and second cylindrical member 23 and 24 are bent outward and inward, or toward each other respectively. Thus, a circular slit like opening 34 is formed between the upper end of the first and second cylindrical members 23 and 24. The first and second cylindrical members 23 and 24 are connected to each other with a connecting member which are not shown in a sound path 26 formed between the first and second cylindrical members 23 and 24. The not-shown connecting member is so arranged that the transmission of the sound-wave is deteriorated and the wave-form of the sound-wave is damaged.

A cylindrical enclosure 28 is fixed to the bottom of the second cylindrical member 24. The bottom of the enclosure 28 is supported on the floor S by rubber springs 30 through mounting plates 31. A noise cancelling signal generator 29 is arranged on the bottom of the enclosure 28. A loud speaker 27 as sound-wave generating means is fixed at the central opening of the bottom of the second cylindrical member 24. The loud speaker 27 has a well-known construction and it is nearly conical. A conical vibrating member or cone 27b made of paper is extended in the loud speaker 27. When a current is flowed through the coil of a drive part 27a in the loud speaker 27, the cone 27b is vibrated and so a sound-wave is generated upwards.

A vibration pick-up 25, which is, for example, made of piezo-electric element such as a zirconic acid lead, is fixed to the bowl 2 as a movable part of the vibratory parts-feeder 22. The detecting output is supplied to the noise cancelling signal generator 29.

Figure 3:
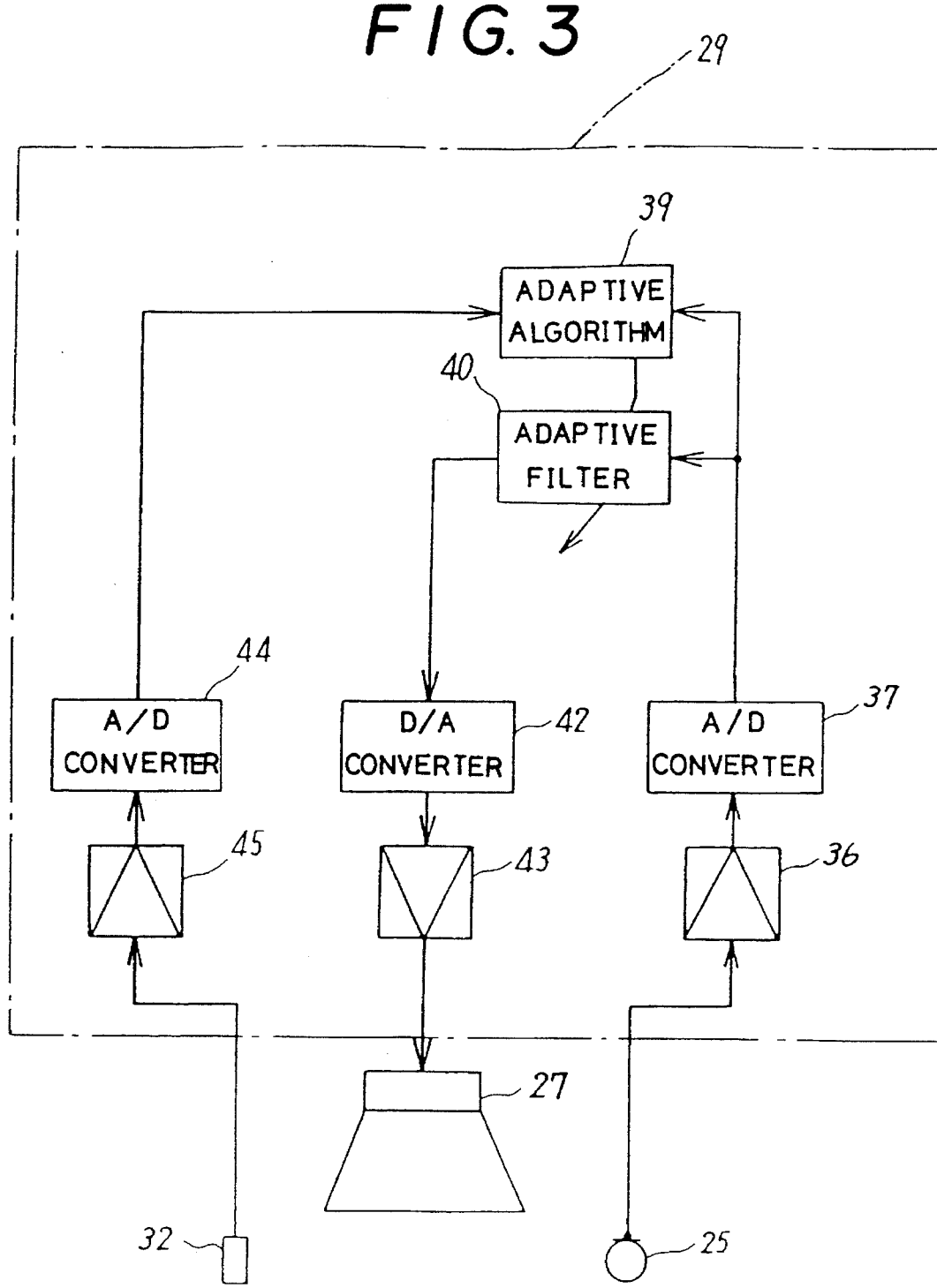
FIG. 3 is a circuit diagram of a noise cancelling signal generator in FIG. 2.

A noise cancelling error detecting microphone 32 is directly above the bowl 2 of the vibratory parts-feeder 22 and the detecting signal is supplied to the noise cancelling signal generator 29. A drive signal obtained by a algorithm shown in FIG. 3 is supplied to the electro-magnetic coil of the drive part 27a of the loud speaker 27.

A cone-shaped sound equallizer 33 is fixed at the center of the bottom of the first cylindrical member 23 and it is facing to the central part of the loud speaker 27, spacing a predetermined distance from each other.

Next, the detail of the noise cancelling signal generator 29 will be described with reference to FIG. 3. An analog output of the vibration detector 25 is amplified by an amplifier 36. It is supplied to an A/D convertor 37 and it is converted thereby to a digital value. The conversion result is supplied to an adaptive algorithm or factor calculator 39 and an adaptive filter 40. Constants and transfer functions of the adaptive filter 40 are changed with the adaptive algorithm 39 in accordance with parameters changing with time such as atmosphere pressure, temperature, humidity, sound pressure and frequency components under the actual noise circumstances. Soud-wave which has the same level as that of the noise and is inverted in sound density to the noise at the position of the microphone 32. The digital input is converted to an analog output by a D/A converter 42 and it is supplied to an amplifier 43 and supplied to the loud speaker 27. Thus, the noise transmitted from the vibratory parts-feeder 22 is cancelled with the sound-wave from the loud speaker 27 at the position of the noise cancelling error microphone 32. The analog output detected by the microphone 32 is amplified by the amplifier 45 and it is converted to the digital value by an A/D converter 44 and it is supplied to the above described digital algorithm 39 and a predetermined calculation is effected there. Thus, the cancelling error at the position of the microphone 32 is compensated.

The vibratory parts-feeder apparatus according to the first embodiment of this invention has been described. Next, the operation will be described.

A high frequency current is followed through the electomagnetic coil of the vibratory parts-feeder 22. The bowl 2 is torsionally vibrated at the same high frequency and parts are transported on the spiral track in the bowl 2. The parts are orientated in a determined posture by not-shown part-orientating means during the transport. The parts in the predetermined posture are transported outwards from the discharge end of the spiral track. In FIG. 2, a straight track portion formed as a discharging end of the spiral track is not shown. However, the parts are transported outwards by the not-shown straight track portion over the first and second cylindrical members 23 and 24.

The frequency of the torsinal vibration is very high such as 100 Hz and it is jarring to the neighborhoood. However, according to this embodiment, the drive signal obtained by calculation of the algorithm in the noise signal cancelling generator 29 is supplied to the drive 27a of the loud speaker 27. Thus, the sound-wave from the loud speaker 27 is inverted in the phase or sound-density in comparison to the noise generated from the vibratory parts-feeder 22 at the position of the microphone 32. The level of the former is equal to that of the latter. Such sound-wave is transmitted and it is radiated outwards from the circular slit opening 34 which is formed between the upper ends of the first and second cylindrical members 23 and 24. In accordance with the slit 34 and the shape effect of the sound path 26, a uniform sound-wave is radiated upwards from the slit 34. Thus, the noise generated from the vibratory parts-feeder 22 is effectively cancelled.

Further, according to this embodiment, the conical sound equallizer 33 is fixed to the center of the bottom of the first cylindrical member 23. The loud speaker 27 is facing to the conical sound equallizer 33. Accordingly sound-wave from the loud speaker 27 is uniformly distributed towards the sound path 26. Thus, the sound-wave to cancel the noise is effectively transmitted from the slit 34.

Further, according to this embodiment, the enclosure 28 surrounds the back of the loud speaker 27. Accordingly, no sound-wave is transmitted outward from the back side of the loud speaker 27. Such sound-wave would damage the sound cancelling effect.

As shown in FIG. 3, an error sound-wave detected by the noise cancelling error detecting microphone 32 is amplified and converted to the digital value by the A/D converter 44 and it is supplied to the adaptive algorithm 39. The sound-wave from the loud speaker 27 is adjusted in phase and so the sound-wave at the position of the noise cancelling detecting microphone 32 is reduced to zero. Thus, feedback operation is used in the embodiment.

Figure 4:
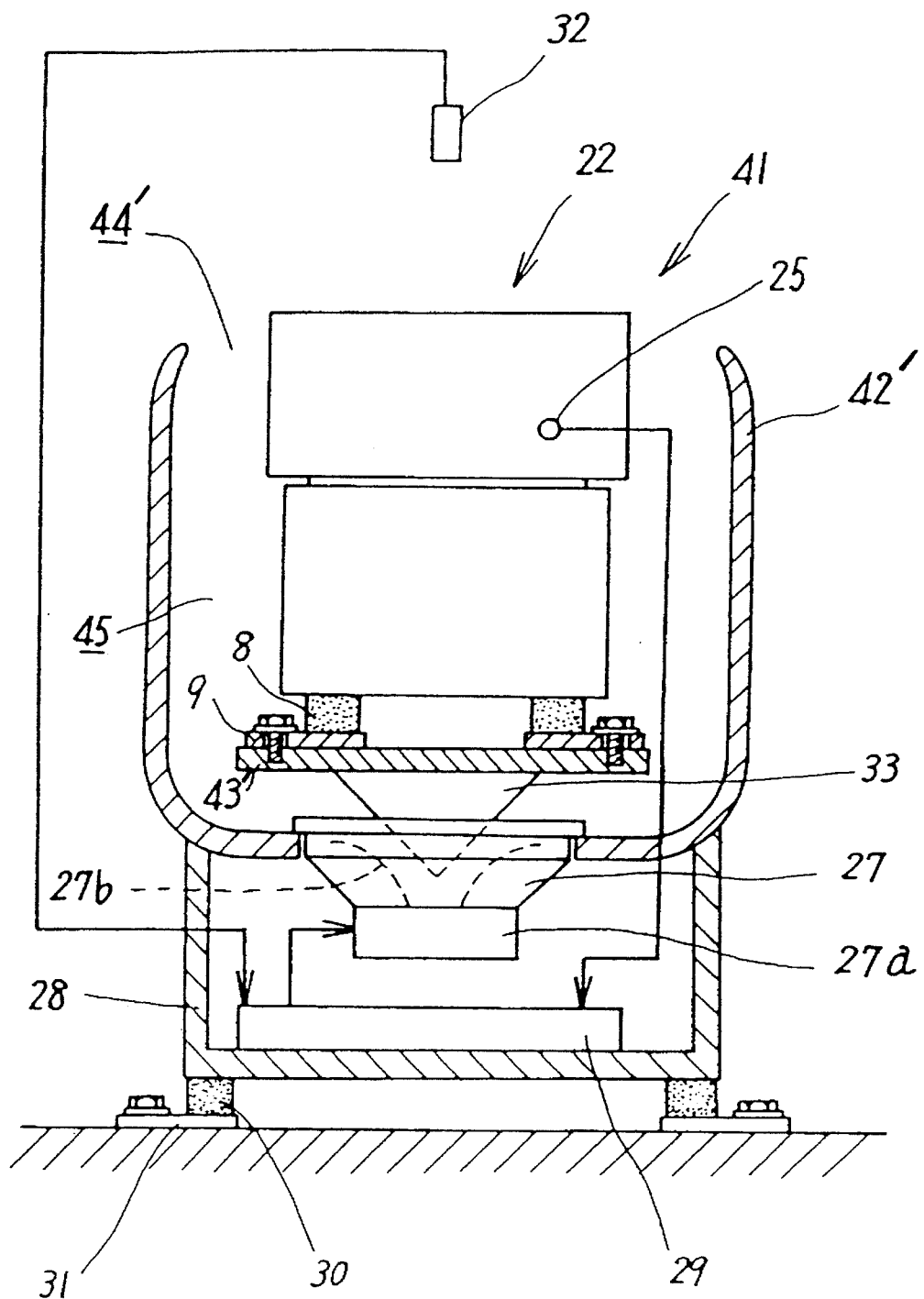
FIG. 4 is a cross-sectional view of a vibratory parts-feeder apparatus according to a second embodiment of this invention.

FIG. 4 shows a vibratory parts-feeder apparatus according to a second embodiment of this invention and it is generally denoted by a reference numeral 41. The parts which correspond to the parts in the first embodiment, are denoted by the same reference numerals, the description of which will be omitted.

In this embodiment, one cylindrical member 42' surround the vibratory parts-feeder 22. A mounting plate 43' is arranged concentrically to the bottom of the cylindrical member 42'. The vibratory parts-feeder 22 is fixed on the mounting plate 43' through rubber spring 8 and mounting plates 9. Although not shown, the mounting plate 43' is connected with the cylindrical member 42' by connecting members. The connecting members are so arranged that the transmission of the sound from the sound speaker 27 is distorted. An annular slit-like opening or radiating portion 44' is formed between the upper end of the bowl of the vibratory parts-feeder 22 and the upper end of the cylindrical member 42'. Thus, a noise cancelling sound-wave radiating portion is formed.

A noise is generated from the vibratory parts-feeder 22 as in the first embodiment. A noise is reduced to zero at the position of the noise cancelling detecting microphone 32 by the radiated sound-wave from the sound-wave radiating portion 44'. Little noise is transmitted to the neighborhood. According to this embodiment, the sound path 45' is formed between the peripheral portion of the vibratory parts-feeder 22 and the inside wall of the cylindrical memeber 42'. Accordingly, the sound path 45' is somewhat irregular or rugged in comparison with the first embodiment. However, when the wave length of sound-wave generated from the loud speaker 27 is long, the rugged and uneven shape of the sound-wave 45' has little influence on the noise cancelling characteristic.

Figure 6:
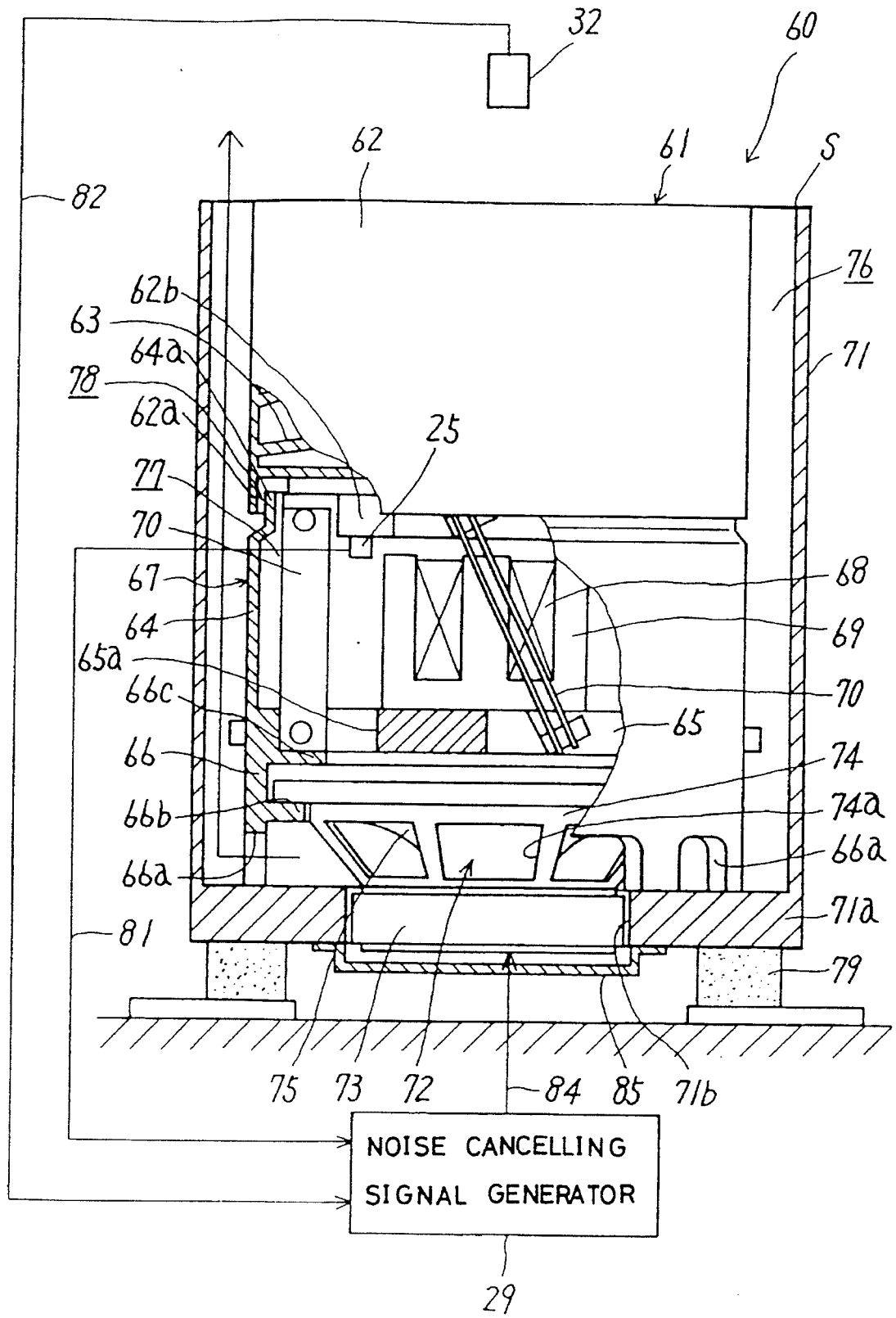
FIG. 6 is a partially broken-away side cross-sectional view of a vibratory parts-feeder apparatus according to a third embodiment of this invention.

FIG. 6 shows a vibratory parts-feeder apparatus 60 according to a third embodiment of this invention parts which correspond to those above embodiment are denoted by the same reference numerals, the description of which will be omitted.

A vibratory parts-feeder 61 is so constructed as in the above embodiment. A spiral track 63 is formed on the inside walls of a bowl 62. It is combined with a base block 65 by leaf springs 70 which are obliquely arranged at regular annular intervals. A movable core 62b is fixed to the bottom of the bowl 62. An electro-magnet 69 with wound electromagnetic coil 68 is facing to the movabele core 62b and is fixed to the base block 65. A torsional vibration generator is composed of the electro-magnetic coil 68, the electro magnet 69 and the leaf springs 70. A cylindrical cover 67 surrounds the torsinal vibration generator. The cover 67 is integrally formed with the base block 65. Of course, the cover 67 and the base block may be made separately, and they may be fixed to each other by bolts. Annular horizontal plate portions 66b and 66c are integrally formed with the base block 65 to form an annular recess. The lower end of the base block 65 is fixed to a bottom 71a of an outer cover 71 which is arranged concentrically outward with the base block 65. A plural openings 66a are formed at lower end portion of the cover 67. An annlar space 76 is formed between the cover 64 and the outer cover 71 and between the outer surface of the bowl 62 and the cover 71, and it communicates through the plural openings 66a with a lower surface of a vibrating plate of a loud speaker 72. A flange portion of the loud speaker 72 as a sound-wave generator is fixed at the annular recess under the inner cover 64. A coil part 73 of the loud speaker 72 is arranged at the position of central opening of the bottom 71a of the outer cover 71. The output signal of the noise cancelling singnal generator 29 is supplied to the coil part 73. A cover 85 is fixed to protect the coil part 73, to the outer wall of the bottom 71a of the outer cover 71. A plural openings 74a are formed in a casing 74 of the loud speaker 72. The whole vibratory parts-feeder apparatus 60 is supported on the floor by rubber spring 79. A vibration pick-up 25 is fixed to the movable core 62b.

The construction of the vibratory parts-feeder appatratus 60 according to the third embodiment of this invention has been described. Next operation will be described.

When an alternative current is flowed through the electromagnetic coil 68, the bowl 62 is torsionally vibrated as in the above embodiments. The parts are transported along the spiral track in the bowl 62. The output of the vibration pick-up 25 is supplied to the noise cancelling signal generator 29. The signal from the noise cancelling error microphone 32 is supplied to the noise cancelling signal generator 29 through an electro wire 82. The output of the noise cancelling signal generator 29 is supplied to the coil part 73 of the loud speaker 72 through an electric wire 84. A paper cone 75 is vibrated in the loud speaker 72. Sound-wave is generated therefrom. It is transmitted through the openings 74a and plural opening 66a formed at the lower end portion of the inner cover 67. Thus, the sound-wave from the loud speaker 72 is transmitted outwards through the annular sound path 76. Outside of the vibratory parts-feeder 61, no noise is transmitted. The internal space communicating with the lower surface of the bowl 62 are communicating with a gap 78 formed between the upper end 64a of the inner cover 64 and the lower end portion 62a of the bowl 62. The sound-wave from the loud speaker 72 and the noise from the torsinal vibrating portion are equal to each other in amplitude at the position of the microphone 32. However, they are inverted there to each other in phase or high and low levels of density. Thus, the noise is cancelled by the sound-wave from the loud speaker. A leak sound from the gap 78 has no influence on the sound-wave passing through the sound path 76. Noise component is prevented from leaking out from the internal space. The space facing to the upper side of the loud speaker 72 is a closed space 77. It communicates merely through the gap 78 with the sound path 76. It has a sufficient volume. Thus, it has little influence on the vibrating plate 75. Accordingly, the vibrating portion 75 can be freely vibrated.

Figure 7:
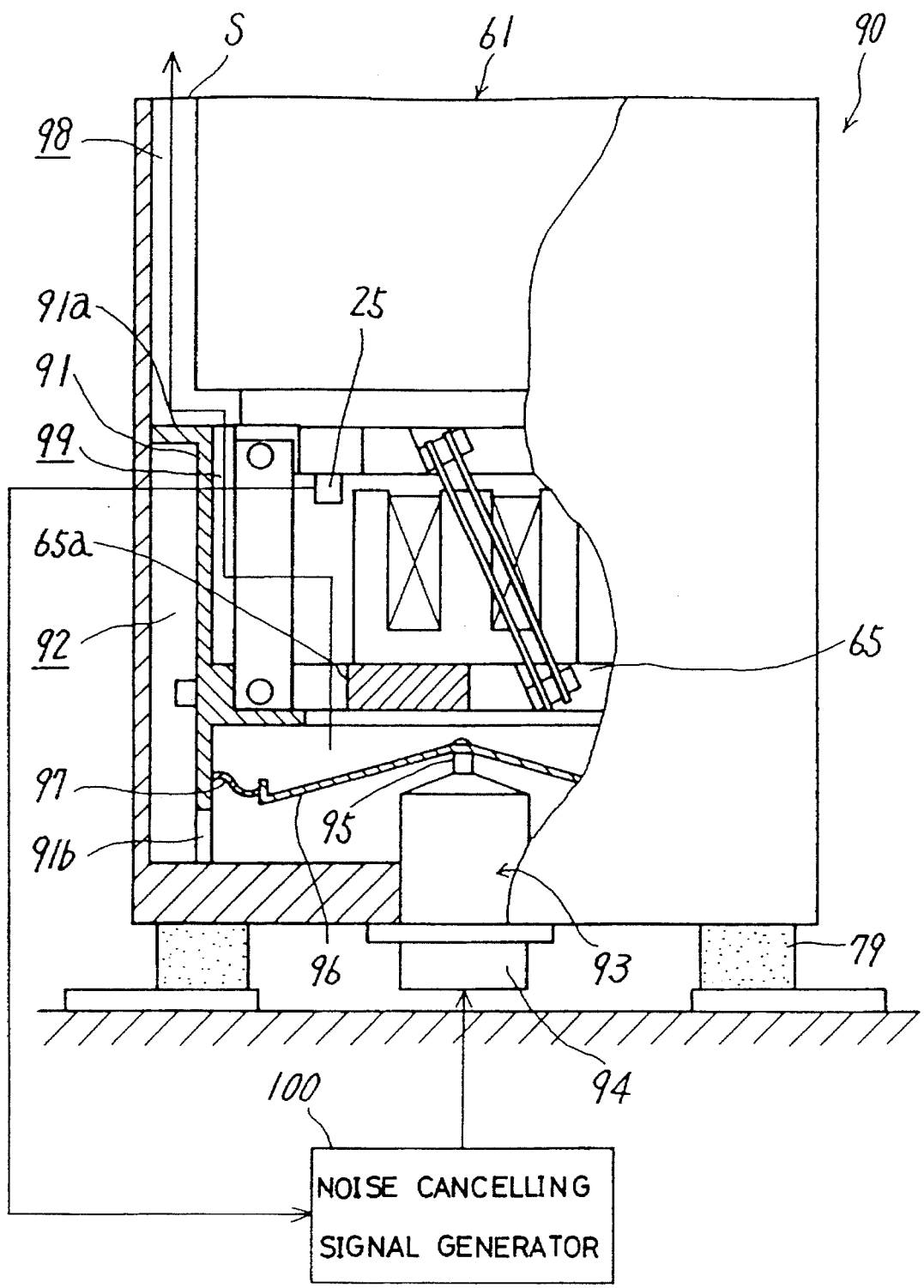
FIG. 7 is a partially broken-away cross-sectional side view of a vibratory parts-feeder apparatus according to a fourth embodiment of this invention.

FIG. 7 shows a vibratory parts-feeder apparatus 90 according to a forth embodiment of this invention. The vibratory parts-feeder 61 is so constructed as in the third embnodiment. The parts which correspond to those in third embnodiment, are denoted by the same reference numerals, the description of which will be omitted.

An inner cover 91 is fixed on a base block 65 as in the above embodiment. A downward elongation of the cover 91 is fixed to the bottom 71*a* of the outer cover 71. An actuator 94 of a sound-wave generator 93 is fixed to the outer surface of the bottom of the outer cover 71. It is made of piezo-electric element. The output of a noise cancelling signal generator 100 is supplied to the piezo-electric element. Thus, the stress occurs in the piezo-electric element. It is amplified by a displacement increasing mechanism contained in the actuator 94. It is connected to an output shaft 95. A cone-shaped vibrating plate 96 is fixed to the top end of the output shaft 95. It is vibrated upward and downward. The sound-wave signal is supplied to the actuator 94. The peripheral portion of the vibrating plate 96 is combined with the inner wall of the innner cover 91 through an edge material 97.

An upper end portion of the inner cover 91 is bent outward in the radial direction to form a horizontal flange portion 91*a*. It is fixed to the inside wall of the outer cover 71. Thus, an annular close space 92 is formed between the outer cover 71 and the inner cover 91. It communicate through plural openings 91*b* formed at a lower end portion of the inner cover 91 with a lower side of the vibrating plate 96. The upper surface of the vibrating plate 96 faces to a space under the base block 65 and it is communicating through an opening 65*a* with a space 99 in which the torsinal vibrating generator is arranged. The sound-wave to cancel the noise is generated by the vibration of the vibrating plate 96. It is transmitted to the annular space 98 between the outer peripheral portion of the bowl 62 and the outer cover 71. Thus, the sound-wave is transmitted outwards to cancel the noise.

Figure 8:
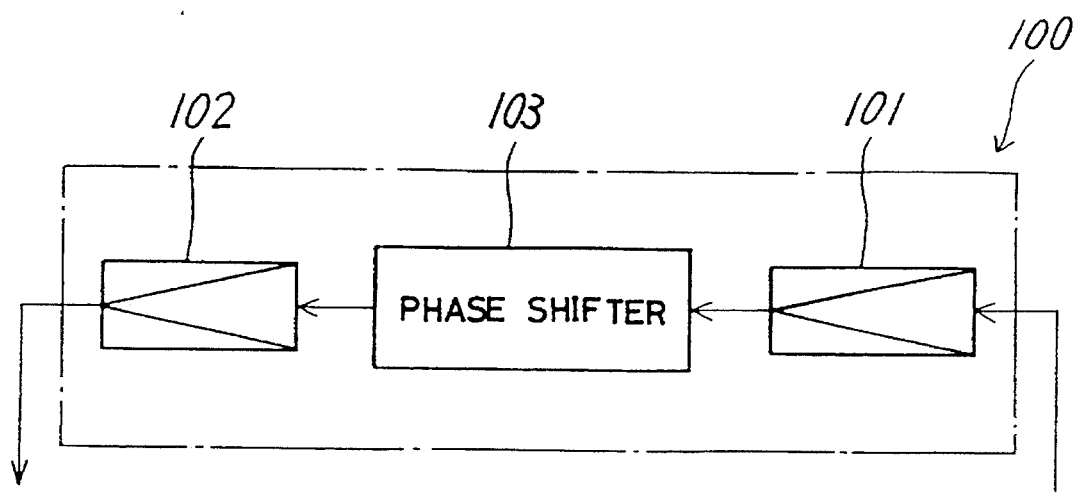
FIG. 8 is a circuit diagram showing another variation of the noise cancelling signal generator.

In the above embodiment, the noise cancelling signal genrator 29 is a digtal circuit. FIG. 8 shows an analog circut. This noise cancelling signal generator 100 consists of amplifiers 101, 102 and a phase shifter 103 connected between the amplifiers 101 and 102. The phase shifter 103 is, for example, a band-pass filter, a low pass-filter, high pass-filter or a combination of them, namely a graphic equallizer. The output of the vibration pick-up 25 is supplied to the amplifier 101. The output is supplied to the actuator 94.

The vibratory parts-feeder apparatus 90 according to the fifth embodiment of this invention has been described. The operation will be described. The noise cancelling signal is supplied to the actuator 94 from the noise cancelling signal generator 100. The vibrating plate 96 is vibrated upward and downward. The sound-wave from the generator 93 is transmitted through the sound path 98 toward the annular gap S.

Thus, the noise is cancelled. Since the underside of the vibrating plate 96 is facing to the annular close space 92. It has a large volume. Thus, it can be freely vibrated without receiving a resistance of air. Thus, a desirable sound-wave is generated.

Figure 9:
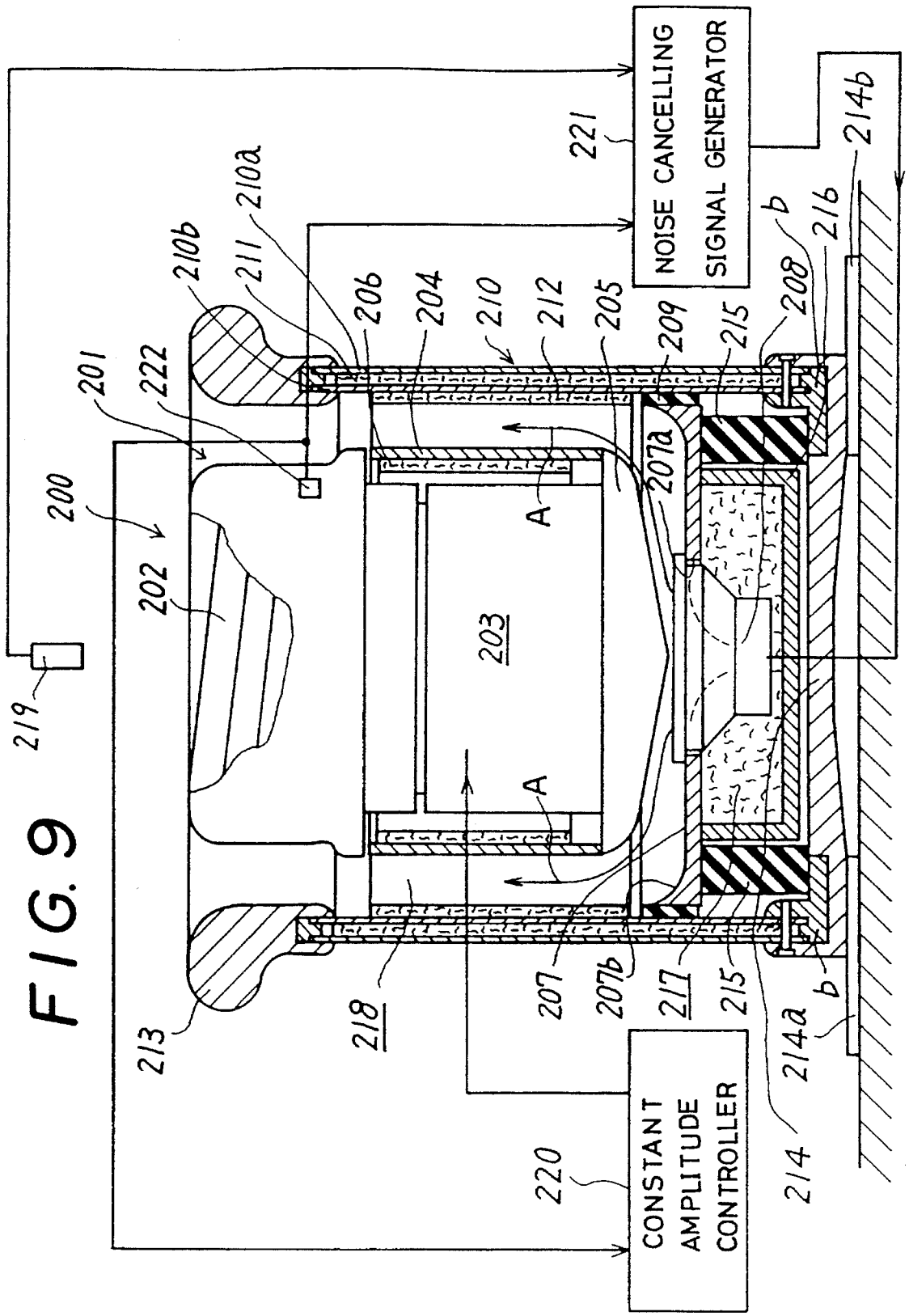
FIG. 9 is a partially broken-away side cross-sectional view of a vibratory parts-feeder apparatus according to a fifth embodiment of this invention.

FIG. 9 shows a vibratory parts-feeder apparatus according a fifth embodiment of this invention and it is generally denoted by a reference numeral 200. A vibratory parts-feeder 201 has a well-known construction. A bowl 202 according to this embodiment has an upper end as round shaped as shown in FIG. 9. A torsional vibrational force is imparted to the bowl 202 by a torsional vibration exciter 203 arranged under the bowl 202.

A leaf spring mounting block or movable core is fixed to the bottom of bowl 202. A cylindrical cover 204 surrounds the torsional vibration exciter 203. A nearly conical sound equallizer 205 is fixed to the lower surface of the torsional vibration exciter 203. A sound absorbing material such as felt 206 is attached to the inner wall of the cylindrical cover 204.

The vibratory parts-feeder 201 is supported on a supporting disk or supporting plate 207 through a not-shown cylindrical support which is so constructed as to have little influence on a sound path 218. An upper flange portion of a loud speaker 208 is fixed at a central opening 207*a* of the supporting plate 207. An outer peripheral portion 207*b* of the supporting plate 207 is so bent upwardly that the inside of the sound path 218 is smoothly constructed, not rugged. A packing 209 made of elastomeric material is attached to the peripheral outer surface of the supporting disk 207 as to fill the gap. A close casing 216 is fixed to the lower surface of the supporting plate 207 and it is packed with a sound absorbing material 217 such as glass wool. Accordingly, the back surface of the vibrating plate of the loud speaker 208 is arranged in the glass wool 217. Thus, the sound-wave from the back side of the loud speaker 208 can be prevented to leak outward. A second cylindrical member 210 and base member 214 are arranged outside of the close casing 216. The second cylindrical member 210 is concentrically arranged with the cylindrical member 204. According to this embodiment, the second cylindrical member 210 consists of two parallel walls 210*a*, 210*b* spaced from each other. Sound absorbing material such as felt 211 fills the annular space between the walls 210*a* and 210*b*. Felt 212 is attached to the inner surface of the inside wall 210*b*, also. The annular sound path 218 having uniform cross-section is formed between the first and second cylindrical members 204 and 210. The sound equallizer 205 is facing to the upper surface of the vibrating plate of the loud speaker 208. A noise cancelling sound wave passes through the sound path 218 from the loud speaker 208 in the manner as shown by the arrow A. A bulge portion 213 bent outwardly in the radial direction is fixed at the upper end of the second cylindrical member 210.

The supporting disk 207 is supported on the base member 214 by four rubber springs 215. The lower end portion of the second cylindrical member 210 is fixed through a mounting member b to the base member 214. The vibratory parts feeder 201 is interrupted acoustically against the outward. Further, the second cylindrical member 210 is insulated vibrationally from the vibratory parts-feeder 201 by the rubber springs 215. Thus, the noise can be prevented from leaking outwards.

Also in this embodiment, a vibration pick-up 222 is fixed at the outer surface of the bowl 202 and it is noise detecting means of this embodiment. The output is supplied to the noise cancelling signal generator 221. A detecting signal of a noise cancelling error detecting microphone 219 is supplied to the noise cancelling signal generator 221. Further in this embodiment, the output of the vibration pick-up 222 is supplied to a constant amplitude controller 220. It has a well-known circuit construction. The output of the vibration pick-up 222 is compared with a predetermined amplitude set in the controller 220. Thus, the current flowing through the electro-magnetic coil is controlled in the torsional vibrational force generator- Accordingly, the bowl 202 is so controlled as to vibrate at the predetermined amplitude. The noise cancelling error detecting microphone 219 is directional toward the vibratory parts-feeder 201. It does not receive outward disturbance and noise from any other vibratory parts-feeder. Accordingly, the noise can be effectively cancelled. Next, operation of the vibratory parts-feeder apparatus according to the fifth embodiment will be described.

The vibratory parts-feeder 201 is driven in the same manner as the above embodiments. The bowl 202 is torsionally vibrated and parts are transported along the spiral track formed on the inside surface of the bowl 202. For example, the parts are supplied to the next stage in a predetermined posture. In this embodiment, the driving frequency is very high such as 560 Hz and accordingly, the wave length is very short. Such a sound-wave is radiated outward from vibratory parts-feeder 201. On the other hand, the detecting signal of the vibration pick-up 222 attached to the bowl 202 is supplied to the noise cancelling signal generator 221 to drive the loud speaker 208. The driving signal is formed on the basis of the above described algorithm. The vibrating plate of the loud speaker 208 is driven by the driven current and noise cancelling sound-wave is radiated towards the equallizer 205. The noise cancelling sound-wave is distributed uniformly all over the range of 360° by the equallizer 205. The noise cancelling sound-wave passes through the sound path 218 having annular cross-section between the cover member 204 and the cylindrical member 210. It is radiated upwards and outwards from the upper ends of the sound path 218. Since the bulge portion 213 is bent outwardly, the opening is similar to an opening of a trumpet and flute. Accordingly, the sound is uniformly radiated outwards. The gain and phase of the radiated sound are uniform all over the opening. Accordingly, the level of the noise of a short wave length can be effectively reduced by the noise cancelling sound generated from the loud speaker 208. According to this embodiment, the microphone 219 is directional and so the noise is more effectively cancelled with the noise cancelling sound made by the noise cancelling signal generator 221. The output of the directional microphone 219 is supplied to the noise cancelling signal generator 221 so that the drive current supplied to the loud speaker 208 is controlled and the level of the noise at the error detecting microphone 219 can be reduced to zero. As the result, the noise can be scarcely transmitted outwards from the vibratory parts-feeder 201.

Further, according to this embodiment, the detecting amplitude of the vibration pick-up 222 attached to the bowl 202 is supplied to the constant amplitude controller 220. It is compared with the predetermined amplitude set in the controller 220. The current to flow through the torsional vibration generator 203 is controlled in accordance with the comparison result. Thus the amplitude of the bowl 202 is controlled to the predetermined amplitude. Accordingly, the vibration pick-up 202 functions for the constant amplitude control of the bowl 202 and the detecting of the noise level generating from the parts-feeder 201. It is not specially required for the noise cancelling. Thus, the cost can be lowered.

Further, according to this embodiment, since the back side of the vibrating plate of the loud speaker 208 is surrounded by glass wool 217, the sound-wave radiated from the back side of the loud speaker 208 is absorbed. Accordingly, it is prevented from transmitting outwards. Further, according to this embodiment, the vibratory parts-feeder 201 is supported through the supporting disk 207 and the rubber springs 215 onto the base member 214. The torsional vibration generator 203 is vibrated by the reaction force, also. However, the vibration is absorbed by the rubber springs 215 and it is prevented from transmitting to the outward cylindrical member 212. No noise is generated from the outward cylindrical member 210. Thus, the noise generated from the vibratory parts-feeder 201 can be effectively prevented from transmitting outwards.

Further, according to this embodiment, the first cylindrical member 204 and the second cylindrical member 210 are extended in parallel with each other.

Accordingly, there is a possibility that a stationary wave is generated in the sound path 218 under a certain wave length. However, the felt as sound absorbing material is attached to the inside surface of the outward cylindrical member 210. Thus, the stationary wave can be effectively prevented from generating.

Further, according to this embodiment, the outer peripheral portion 207b of the supporting disk 207 is bent upwards so that the cross-section of the sound path 218 under the equallizer 205 is uniform and smooth. Such arrangement secures the uniform transmission of the noise cancelling sound-wave. Further, the flexible packing 209 is attached to the outer surface of the supporting disk 207. Accordingly, the noise cancelling sound is prevented from leaking to the sound path 218 through the gap between the inner surface of the cylindrical member 210 and the outer surface of the supporting disk 207, although the back side of the loud speaker 208 is in the glass wool 217. The supporting disk 207 is vibrated by the reaction of the torsional vibration generator 203 of the vibratory parts-feeder 201. Since the packing 209 is elastomeric, the vibration is absorbed and the damage of the disk 207 of the outer cylindrical member 210 can be prevented.

Figure 10A:
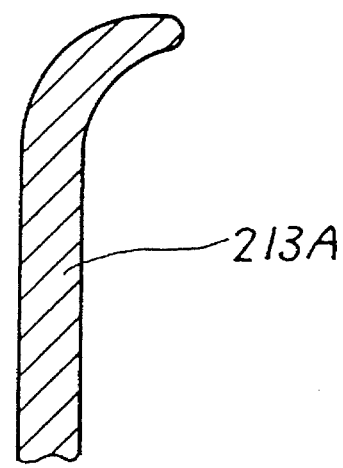
FIGS. 10A–C shows variations of the bulge portion in FIG. 9, A shows a first variation, B shows a second variation, C shows a third variation.
Figure 10B:
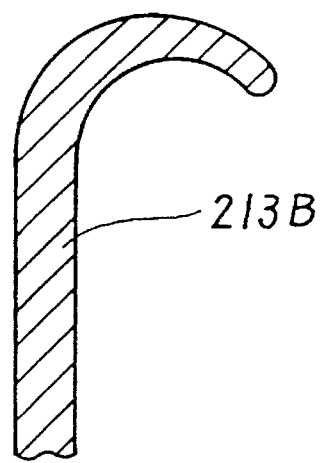
Figure 10C:
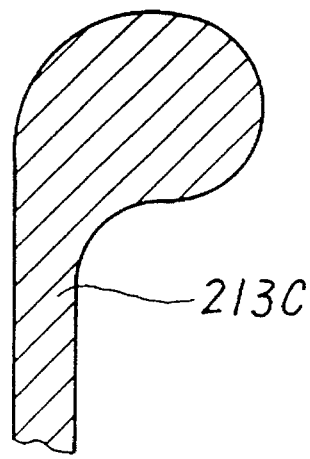

The outward bent bulge portion or ring member 213 is fixed to the upper end of the outer cylindrical member 210. Variation of the bulge portion 213 are shown in FIG. 10 A ,B and C. In FIG. 10A, an upper end 213A of the outer cylindrical member 210 is bent upward and outward in the radial direction. The thickness of the cylindrical member 210 is constant all over the whole length. In FIG. 10B, an upper end portion 213B is integrally formed with the outer cylindrical member 210 and the upper end is arcuately bent such as a handle of the umbrella. By such arrangement, the same effect as the above embodiment can be obtained. In FIG. 10C, an upper end 213C is similar to the bulge portion 213 of the above embodiment. However, it is integrally formed with the outer cylincrical member 210.

Figure 11:
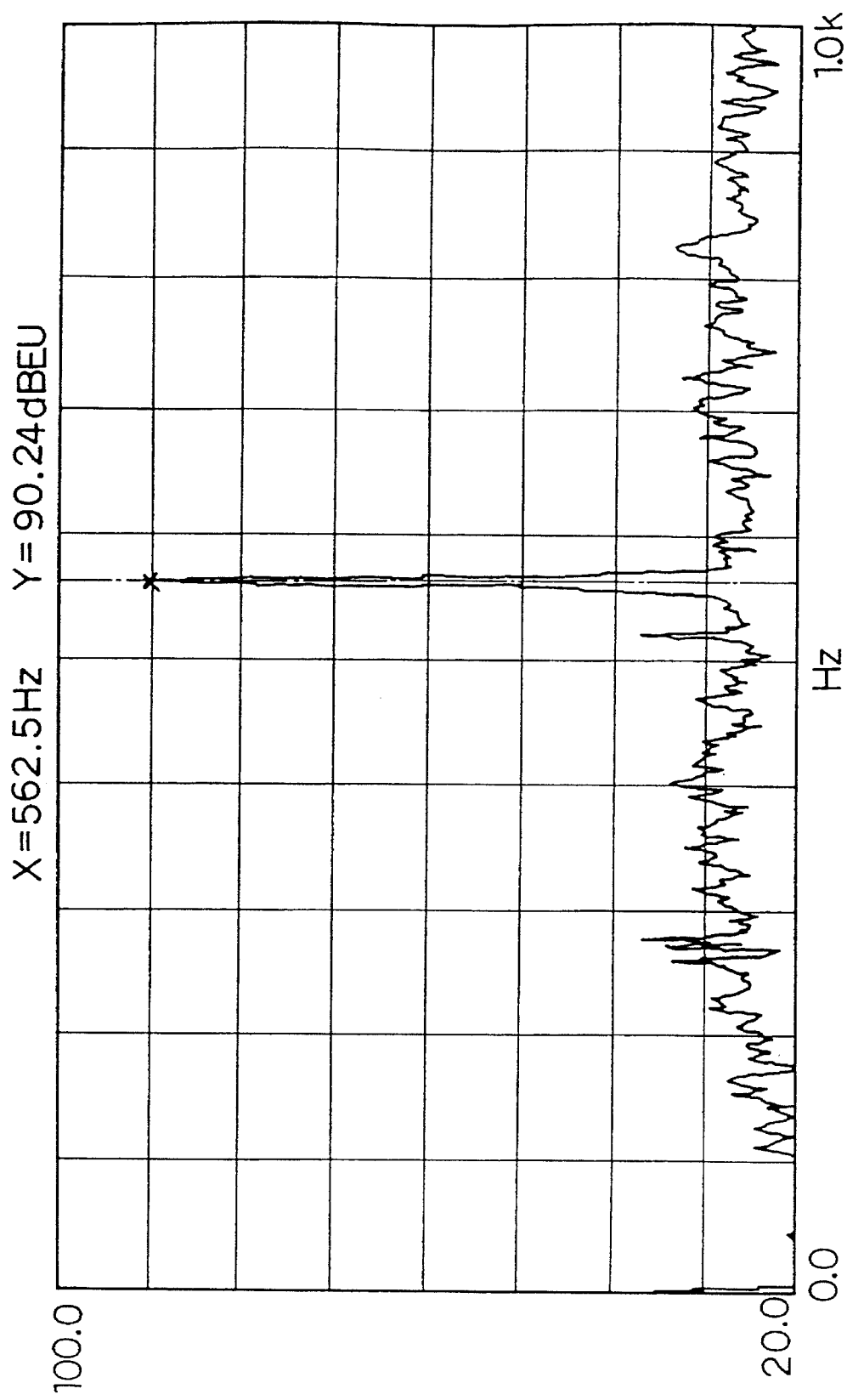
FIG. 11 is a noise data graph obtained by the vibratory parts-feeder apparatus according to the fifth embodiment without using the noise cancelling signal genera tor.
Figure 12:
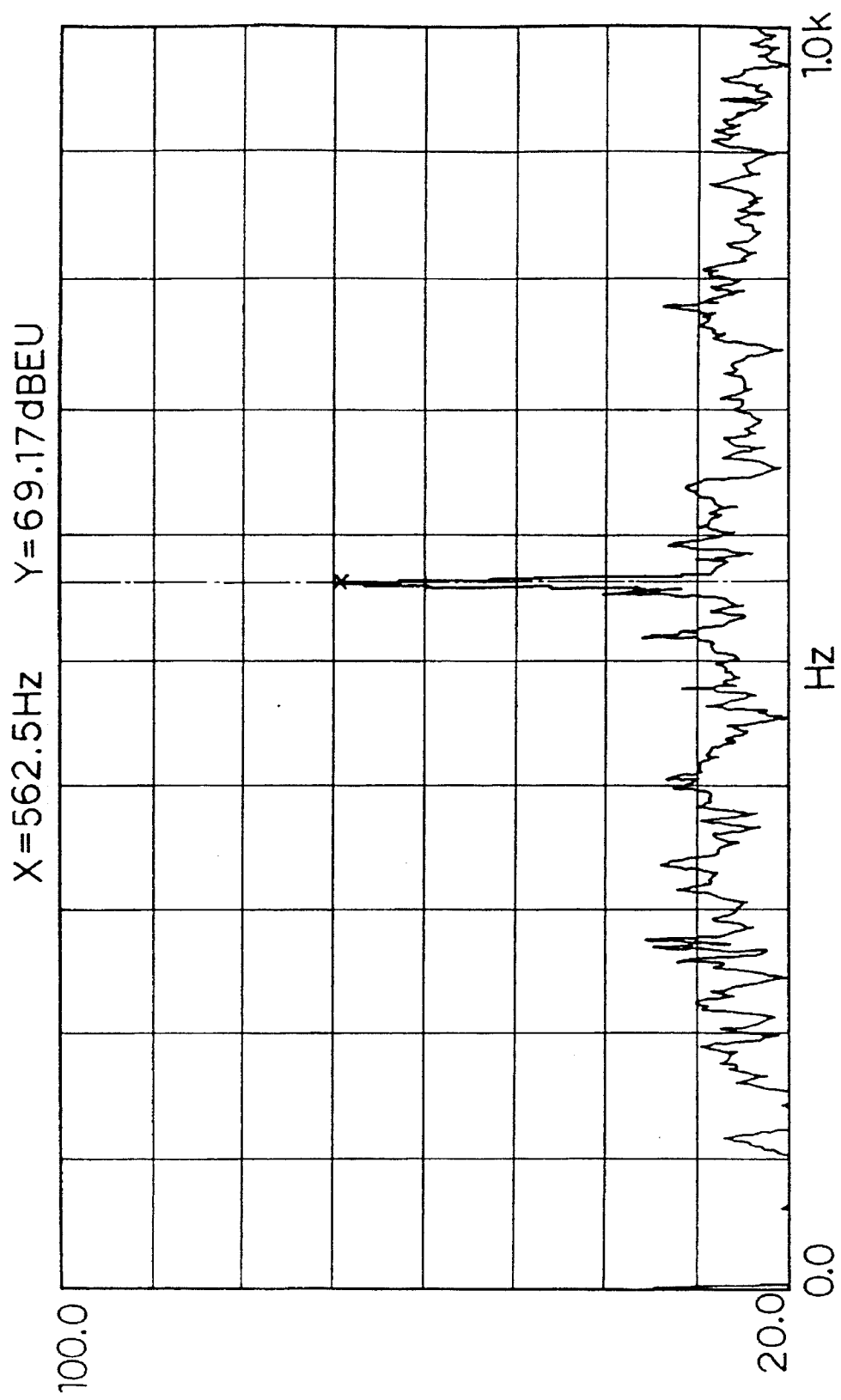
FIG. 12 is the noise graph of the vibratory parts-feeder apparatus of the fifth embodiment using the noise signal cancelling generator.

In FIG. 11 and FIG. 12, graphs show the noise cancelling effect of the fifth embodiment. The axis of the abscissas represents the frequency components of the noise generated from the vibratory parts-feeder 201, and the axis of the ordinates represents the noise level of the frequency component. As clear from the graph of FIG. 11, the noise level is 90.24 dBEU near at the drive frequency of 562.5 Hz. It is very high. However, the level is greatly reduced to the 69.17 dBEU near at the drive frequency of 562.5 Hz as shown in FIG. 12 by the noise cancelling signal generator according to the fifth embodiment. The noise from the vibratory parts-feeder 201 is very jarring to the neighborhood. However, the noise level has been reduced to the comfortable condition. The data in FIGS. 11 and 12 have been obtained in the case when the bowl 202 is vibrated at the constant amplitude. The noise level was measured at the point at the height of 250 mm from the horizontal bottom of the bowl 202 and distant by 1000 mm from the center of the bowl 202.

Figure 13:
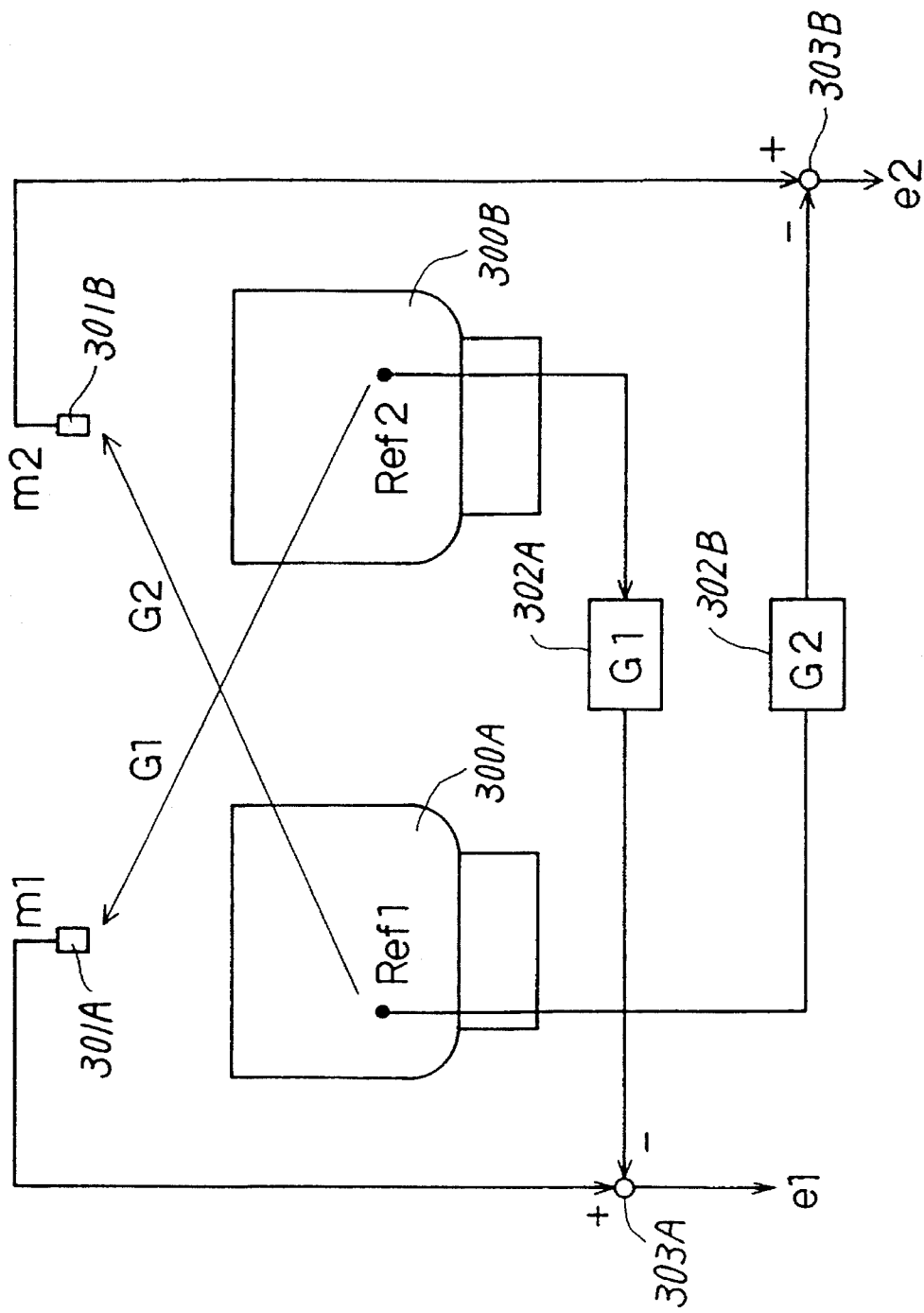
FIG. 13 is a schematic view of a vibratory parts-feeder apparatus according to a sixth embodiment of this invention.

FIG. 13 shows a vibratory parts-feeder apparatus according to a sixth embodiment of this invention. It consists of a pair of vibratory parts-feeder apparatus members 300A and 300B. They are arranged adjacent to each other. Noise cancelling error microphones 301A, 301B are arranged directly above the vibratory parts-feeder apparatus members 300A, 300B respectively. Although they are schematically shown, they are constructed in the same manner as the fifth embodiment of this invention. Vibration pick-ups Ref 1 and Ref 2 are attached to movable portion or torsional vibrating force generators of the vibratory parts-feeder apparatus 300A and 300B. Output signals of the vibration pick-ups Ref 1 and Ref 2 are supplied to digital filters 302A and 302B which include analog /digital convertors respectively. The transfer function $G_1$ represent path from the vibration pick-up Ref 2 attached to movable portion of the one vibrating parts-feeder apparatus member 300B to the noise cancelling error microphone 301B arranged above the other vibrating parts-feeder apparatus member 300B, while the other transfer function $G_2$ represents the path from the vibration pick-up Ref 1 attached to the movable portion of the other vibrating parts-feeder apparatus member 300B to the noise cancelling detecting microphone 301A arranged directly above the one vibratory parts-feeder apparatus member 300A. These transfer functions $G_1$ and $G_2$ may be obtained by the actual measurements, or they may be estimated. In any case, the outputs of the digital filters 302A and 302B are supplied to subtracters 303A and 303B and the outputs of the subtracters 303A and 303B correspond to the actual noise generating from the parts-feeder apparatus members 300A and 300B. The error signals $e_1$ and $e_2$ are measured and the driving signals for the loud speakers are so adjusted that the error signals $e_1$ and $e_2$ are reduced to zero by the above described algorithm.

Figure 14:
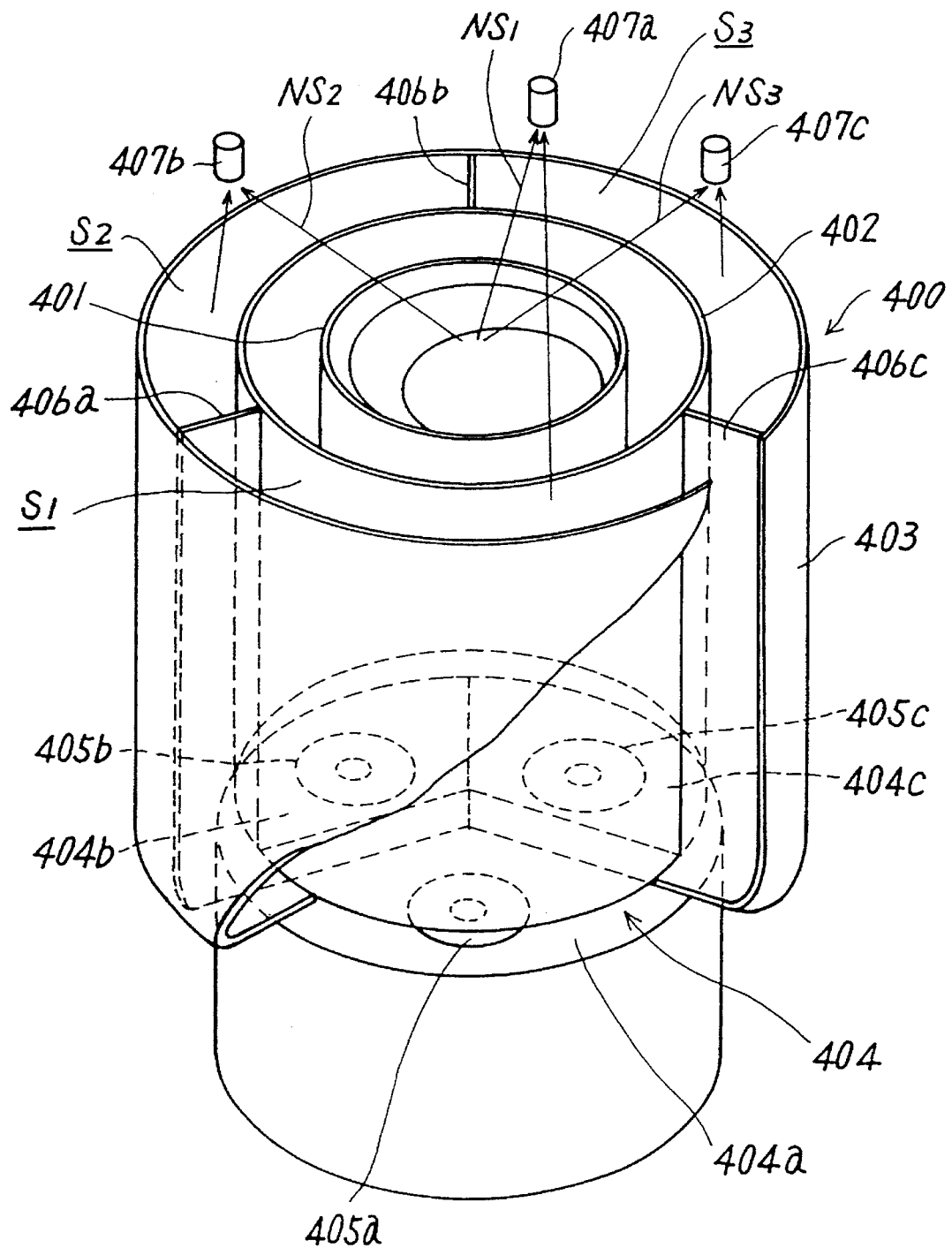
FIG. 14 is a partially broken-away perspective view of a vibratory parts-feeder apparatus according to a seventh embodiment of invention.

FIG. 14 shows a vibratory parts-feeder apparatus according to a seventh embodiment of this invention. And it is generally denoted by a reference numeral 400. An upper portion or bowl of a vibratory parts-feeder 401 is shown in FIG. 14. However, the vibratory parts-feeder 401 is so constructed as in the above embodiment. The vibratory parts-feeder 401 is surrounded by an inner cylindrical member 402 and it is surrounded concentrically with an outer cylindrical member 403. An annular path is formed between the inner and outer cylindrical members 402 and 403. The sound path is divided into three spaces by partition walls 406a, 406b and 406c. In this embodiment, the sound path is divided equally into 120 degrees. Loud speakers 405a, 405b and 405c are arranged at the bottom of sound paths $S_1$, $S_2$ and $S_3$. A close casing fixed to the lower side may be constructed as in the above embodiment. It is preferable that the casing is divided into three spaces. Noise cancelling error detecting microphones 407a, 407b and 407c are arranged above the sound paths $S_1$, $S_2$ and $S_3$. Noise is generated from the vibratory parts-feeder 401 and it is cancelled with the noise cancelling sound waves generated from the loud speakers 405a, 405b and 405c. The noise cancelling errors are detected by the noise cancelling errors detecting microphones 407a, 407b and 407c. They are supplied to not-shown noise cancelling signal generators. The driving currents for the loud speakers 405a, 405b and 405c are so adjusted that the noise cancelling error signals are reduced to zero. This embodiment is preferable in the case that the diameter of the bowl is relatively large in comparison with the wave length of the noise. With such arrangement, noise cancelling sound waves transmitted from the sound paths $S_1$, $S_2$ and $S_3$ cancel effectively the noises $NS_1$, $NS_2$, $NS_3$ from the vibratory parts-feeder 401.

Figure 15:
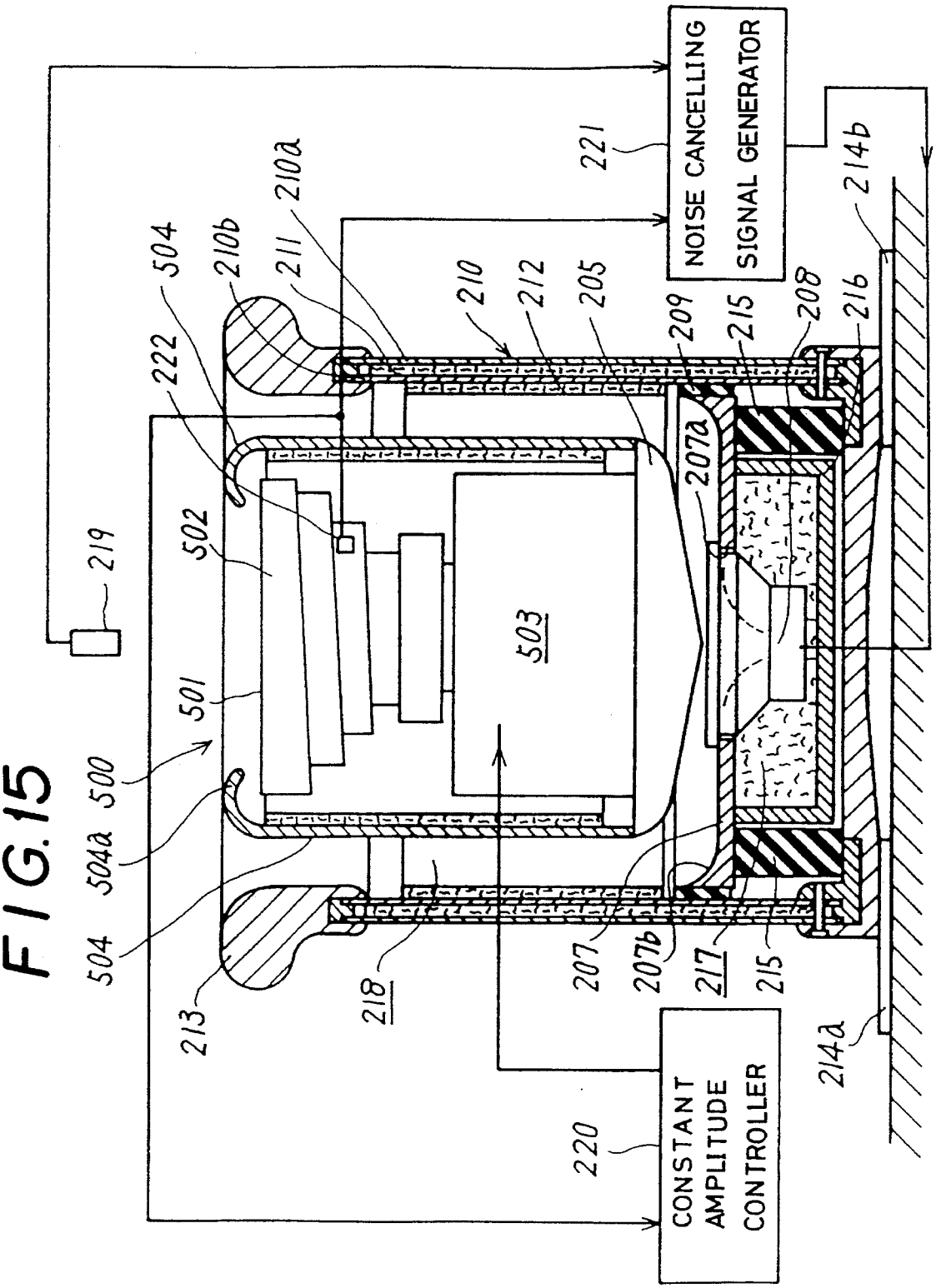
FIG. 15 is a partially broken-away side cross-sectional view of a vibratory parts-feeder apparatus according to an eighth embodiment of this invention.

FIG. 15 shows a vibratory parts-feeder apparatus according to an eighth embodiment of this invention and it is generally denoted by a reference numeral 500. A vibratory parts-feeder 501 consists of a bowl 502 and a torsional vibration generator 503 for torsionally vibrating the bowl 502. The construction is nearly equal to those of the above embodiments. Accordingly, the detail description of which will be omitted.

According to this embodiment, the shape of the bowl 502 is stepped. In this case, an inner cylindrical member 504 extend above the upper end of the bowl 502. And an upper end 504a is inwardly bent. Thus, the transmission characteristic of the sound wave is made more preferable. The outer cylindrical member 210 extends to the same level as the inner cylindrical member 504. The noise from the vibratory parts-feeder 501 can be cancelled effectively by the above described noise cancelling signal generator 221.

Figure 16:
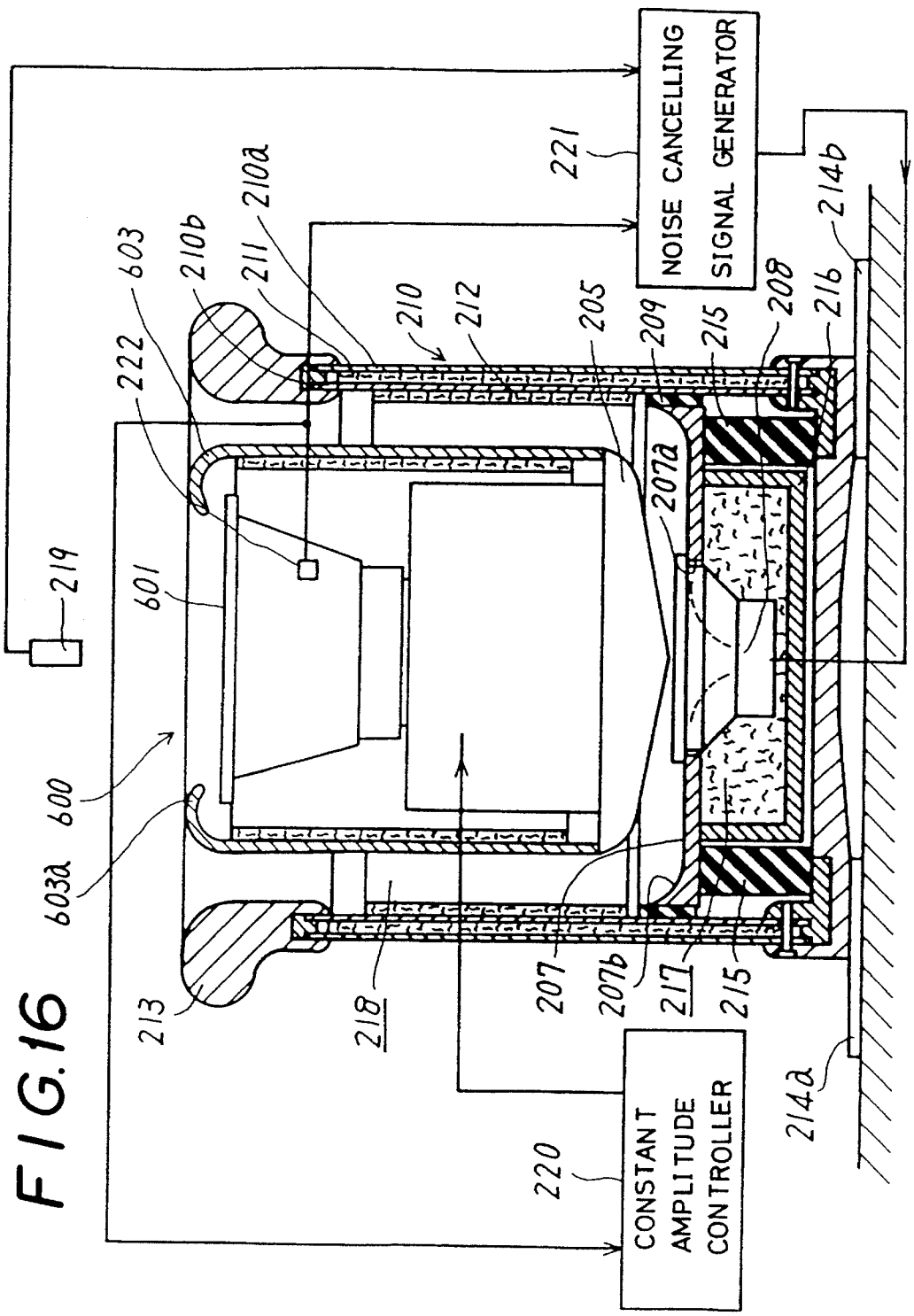
FIG. 16 is a partially broken-away side cross-sectional view of a vibratory parts-feeder apparatus according to a ninth embodiment of this invention.

FIG. 16 shows a vibratory parts-feeder apparatus according to a ninth embodiment of this invention and it is generally denoted by a reference numeral 600. A bowl 601 of the vibratory parts-feeder 601 is well-known in shape. It is nearly conical. In this embodiment, an inner cylindrical member 603 extends above the bowl 605 and an upper end 603a is bent inward, so that the transmission of the characteristic of the sound-wave is made preferable. This embodiment have the same effect as the above embodiment.

Figure 17:
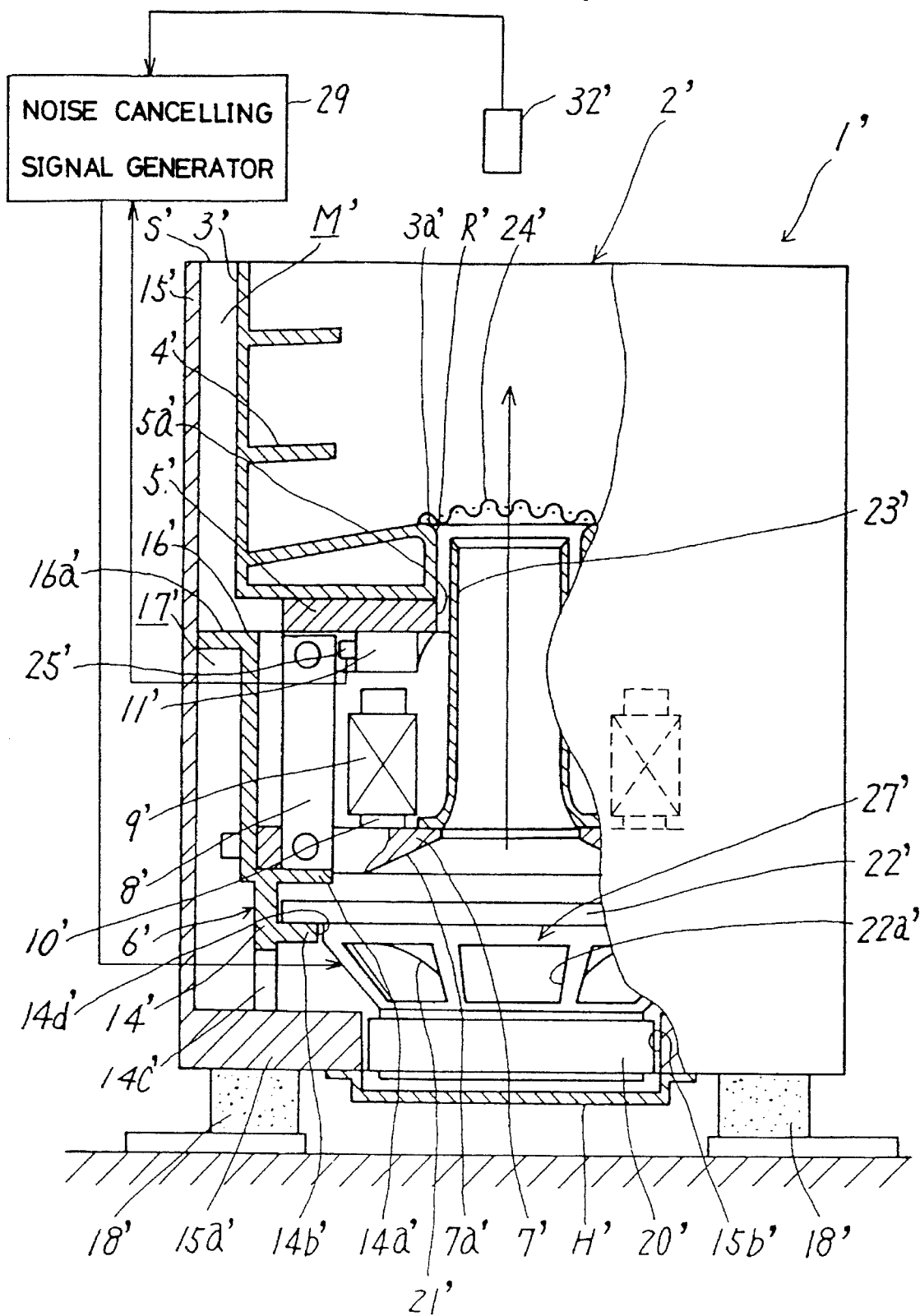
FIG. 17 shows a vibratory parts-feeder apparatus according to a tenth embodiment of this invention.

FIG. 17 shows a vibratory parts-feeder apparatus according to a tenth embodiment of this invention and it is generally denoted by a reference numeral 1'. A vibratory parts-feeder 2' has a cylindrical bowl 3' which contains numeral parts to be handed. A spiral track 4' is formed in the inner surface of the bowl 3'. A block 5' for fixing leaf springs are fixed at the bottom of the bowl 3'. A movable core 11' is fixed at the lower surface of the block 5'. The block 5' is combined with a base block body 7' of a base block part 6' which is arranged under the bowl 3' by leaf springs 8' obliquely arranged at angular regular intervals. An opening 7a' is formed at the center of the base block body 7'. A stationary core 10' for electro-magnet is fixed to the base block body 7'. It is facing to the movable core 11', spacing a gap. An electro-magnet coil 9' is wound on the stationary cylindrical core 10'. And a vibration pick-up 25' is fixed on the block 5'. A mounting plate 14' for mounting a loud speaker 27' as a sound-wave generator is formed integrally with the base block body 7'. A torsional vibratory generator is composed of the electro-magnet core 10' and leaf springs 8'. A cylindrical cover 16' surrounds the torsionally vibratory generator. A flange portion 16a' is formed integrally with an upper end of the cylindrical cover 16'. A cylindrical member 15' with a bottom 15a' is arranged concentrically with the cover member 16'. An enclosed space 17' is formed between the inner cylindrical member 6' and the outer cylindrical member 15'.

A circular opening 15b' is formed at the center of the bottom 15a' of the cylindrical cover 15'. A mounting hole 14d' for the loud speaker 27' is made at the mounting plate 14' in alignment with the opening 15b' of the bottom 15a'.

The loud speaker 27' having well-known construction is fixed at its flange portion 22' to the mounting plate 14'. Plural openings 22a are formed at the peripheral portion of a conical frame. A cone 21' as a vibrating plate is fixed through an edge at the flange portion 22' which is partially seen. A bobbin and a coil are arranged to constitute a voice coil. A cover H' is fixed to the bottom 15a' of the cylindrical cover 15' so as to cover the coil drive part 20' arranged at the center of the bottom 15a' of the cover 15'.

A cylindrical sound duct 23' is fixed straight on the base block body 7'. The upper end of the sound duct 23' is concentric with a central opening 3a' of the bowl 3'. The space between the bowl 3' and the sound duct 23' is so large that they don't interfere with each other. A net 24' as that of a usual audio apparatus is attached to the periphery of the opening 3a' of the bowl 3'. The lower end portion of the sound duct 23' is fixed to the base block body 7' and the central hole 7a' is formed in alignment with it. It is facing to the vibrating plate 21' of the loud speaker 27'. The peripheral edge of the central opening of the bowl 3' is rounded. The vibratory parts-feeder apparatus according to this invention, constructed as above described, is supported on the ground by rubber springs 18'.

An output terminal of a noise cancelling signal generator 29 according to this invention is connected to an electromagnetic coil of the loud speaker 27'. An output of an error sensor micro-phone 32' arranged above the bowl 3' is supplied to the noise cancelling signal generator 29. Further, the vibration pick-up 25' is fixed to the movable core 11' and it is connected to the noise cancelling signal generator 29.

The vibratory parts-feeder apparatus 1' according to the tenth embodiment of this invention has been described. Next, the operation will be described.

The bowl 3' contains numeral parts, although not shown, in the well-known manner. When an alternative current is supplied to the electro-magnetic coil 9', a torsional vibrational force is generated. Thus, the parts are transported along the spiral track 4'.

The frequency of the torsional vibration force is very high such as 100 Hz, and the noise has a high level and so it is very jarring to the neighborhood. However, the drive signal obtained by the calculation of the algorithm in the noise cancelling signal generator 29 is supplied to the drive part 20' of the loud speaker 27'. The sound wave from the loud speaker 27' cancels the noise from the vibratory parts-feeder 2' at the error detecting micro-phone 32'. The frequency of sound-wave from the loud speaker 27 is equal to that of the noise from the vibratory parts-feeder 2' and the phase difference between them is the equal to 180 degree. The sound wave passes through the sound duct 23' and it is transmitted outwards from the bowl 3'. Accordingly, the noise generated from the vibratory parts-feeder 2' is effectively cancelled by the sound-wave from the loud speaker 27'.

Figure 18:
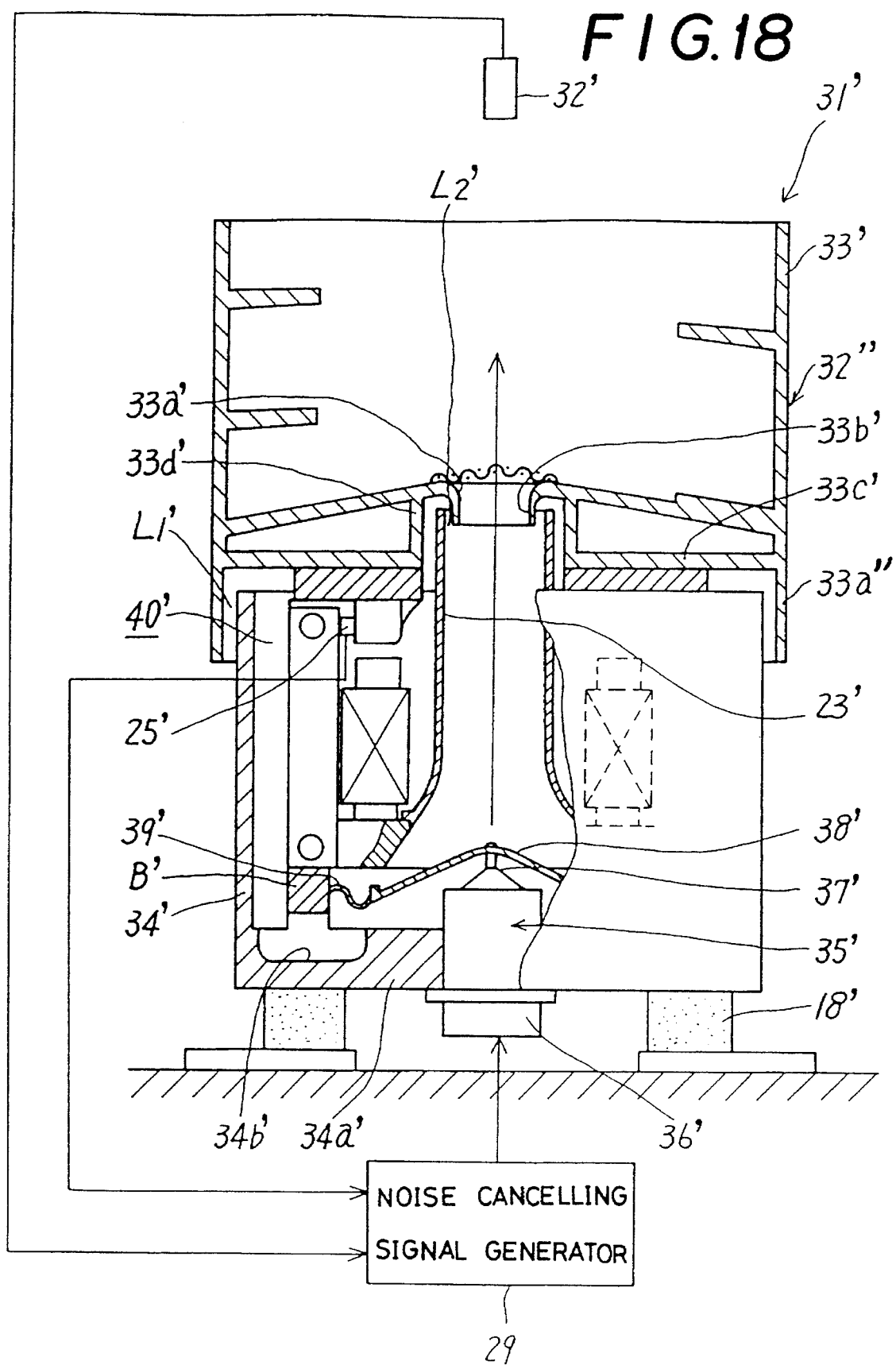
FIG. 18 is a vibratory parts-feeder apparatus according to an eleventh embodiment of this invention.

In the above manner, the drive signal to the loud speaker 27' is supplied from the noise cancelling signal generator 29. The sound-wave to cancel the noise generated from the vibratory parts-feeder body 2' passes through the sound duct 23', and it is transmitted upwards. It is radiated upwards from the vibrating plate 21' of the loud speaker 27'. The vibrating plate 21' communicates through the opening 14c' with the close space 17' which has the large volume. Accordingly, it can be freely vibrated. The desirable soundwave is transmitted outwards from the bowl 3'as shown by the arrow. When the noise cancelling error component is picked up by the error micro-phone 32', it is compensated in the noise cancelling generator 29. The compensated signal is supplied to the loud speaker 27'. As the result, the level of the noise becomes nearly equal to zero at the position of the error detecting micro-phone 32'. Accordingly, the noise is scarcely transmitted outwards from the vibratory parts-feeder. The net 24' is extended above the openings 3a' of the center of the bowl 3'. The parts supplied from the above do not invade the duct 23'. Thus, the above operation can be sufficiently effected. FIG. 18 shows an eleventh embodiment of this invention. It is generally denoted by a refference numeral 31'. A spiral track is formed in a cylindrical bowl 33' of a vibratory parts feeder 32'. In this embodiment, a lower end portion 33a" of the bowl 33' is extended downwards and a gap $L_1$ is formed between a cylindrical cover 34' covering the torsional vibrational force generator and the lower end portion 33a".

According to this embodiment, an actuator 36' including a piezo-electric element generates a vibrational force in a sound-wave generator 35'. The vibration enlarged by a displacement increase mechanism. It is transmitted to an output shaft 37' and it vibrates a conical vibrating plate 38' which is fixed at the center. A sound-wave is transmitted into the sound duct 23'. An outward peripheral portion of a vibrating plate 38' is combined through a edge member 39' with a base block body B'. In the cover 34', the sound duct 23' faces to the upper surface of the vibrating plate 38'. An annular recess 34b' is formed in the base block body B. The lower side of a vibrating plate 38' communicates through it with a space 40'. The space 40' communicates only through a gap $L_1$ with an atmosphere. Because the gap $L_1$ is very small, the space 40' can be considered a closed space.

The output from the noise cancelling signal generator 29 is supplied to the actuator 36'. The sound-wave from the actuator 35' is transmitted into the sound duct 28' as shown by the arrow. The noise from the vibratory parts-feeder 32' is different from the sound wave of the actuator 36' in phase by 180 degrees. The frequencies are equal to each other. Thus, the noise level can be equal to zero near the vibratory parts feeder 31'.

The space 40' communicating with the lower side of the vibrating plate 38' is almost an enclosed space and it has a sufficiently large volume. Accordingly, the vibrating plate 38' can be freely vibrated. According to this embodiment, a downward extension 33b' is formed at the opening 33a' of the bowl 33'. Further, a cylindrical portion 33d' is formed concentrically with the downward extension 33b'. An upper end portion of the sound duct 23' is positioned in the space between the downward extension 33b' and the cylindrical portion 33d'. With such arrangement, although the the sound-wave from the lower surface of the vibrating plate 38' is transmitted into the enclosed space 40, it is prevented from invading the sound duct 23'. Thus, the sufficient noise cancelling effect can be effected.

While the preferred embodiments have-been described, variations thereto will occur to those skilled in the art within the scope of the present inventive concepts which are delineated by the following claims.

Figure 5:
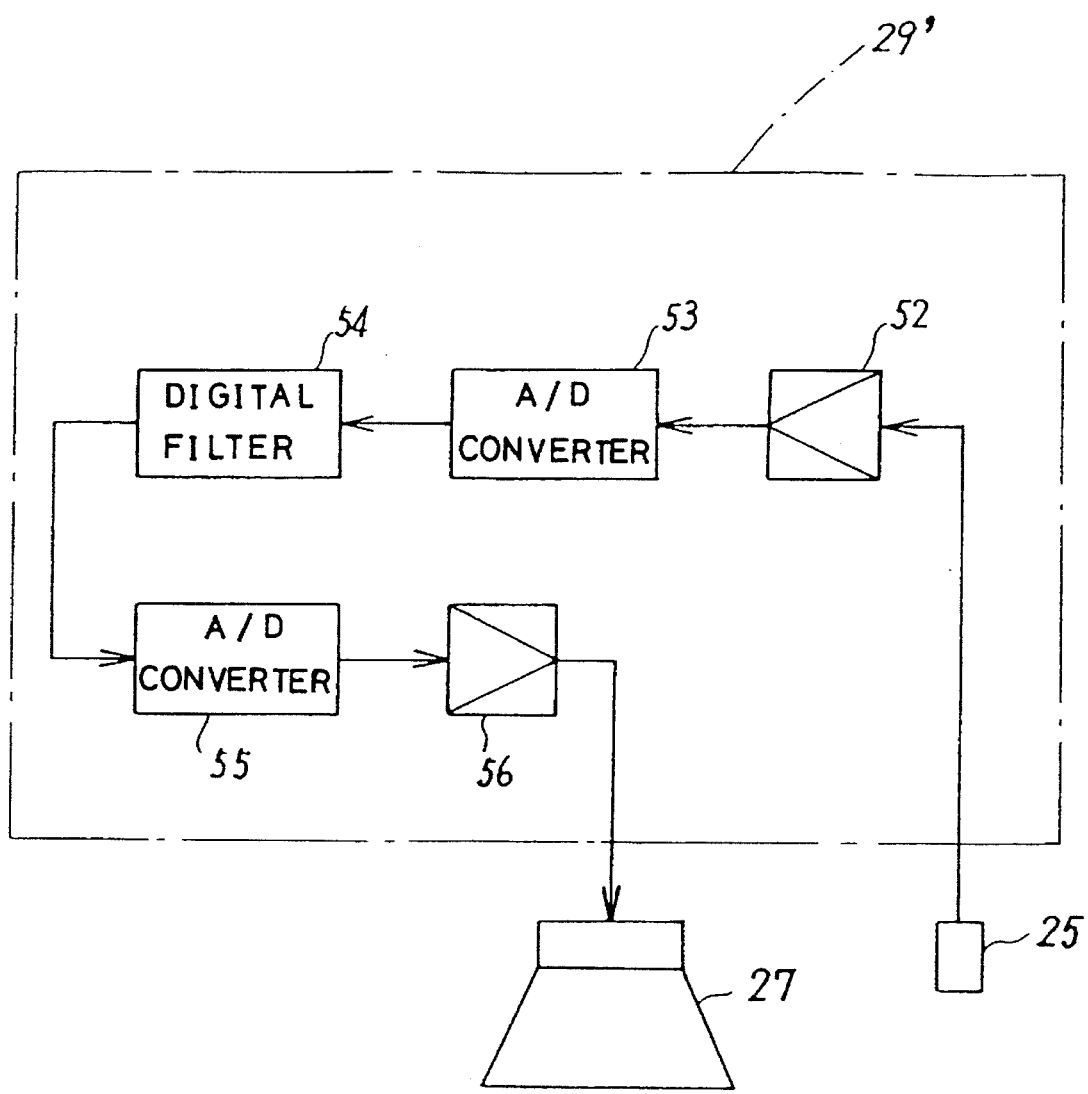
FIG. 5 is a circuit diagram showing one variation of the noise cancelling signal generator in FIG. 3.

For example, the circuit as shown in FIG. 3 has been used in the noise cancelling signal generator 29. However, instead, a circuit as shown in FIG. 5 may be used in the noise cancelling signal generator 29'. In this case, the noise cancelling error detecting microphone 32 may be omitted. A multiplier for the digital filter 54 is obtained by calculation. Although the accuracy is not so good, the level of the noise at the position of the microphone 32 at the first embodiment can be reduced nearly to zero. In FIG. 5 reference numerals 52 and 56 represent amplifiers, reference numerals 53 a A/D convertor and a 55 D/A convertor.

Further, in the above embodiment, the vibration detector 25 is used for detecting the noise generated from the vibratory parts-feeder 22. Instead a displacement detector or a microphone may be used. In this case, for example, it may be arranged near the vibratory parts-feeder between the first cylindrical member 23 and the side surface of the vibratory parts-feeder 22.

Further in the above embodiment, the shape of the noise cancelling sound radiating portion 34 and 44 is circular in accordance with the outer shape of the bowl 2 of parts-feeder. However, when the wave length of the noise cancelling sound-wave is sufficiently large in comparison with the diameter of the bowl 2, the shape may be ellipsoidal or square- Further, the shape of the sound equallizer may be varied in accordance with the shape of the loud speaker 27 facing to it, the transmitting manner of the sound-wave and the wave length of the sound-wave generated from the loud speaker. In some cases, the sound equallizer 33 may be omitted. Further, the noise cancelling detecting microphone 32 used in the second embodiment is not always needed. When a phase shifter is used for forming a noise cancelling sound signal, the noise cancelling signal detecting microphone 32 may be omitted.

Further in the embodiment of FIG. 6, the back side of the cone 75 of the loud speaker 72 is used as a sound-wave generating part. In this case, since the cone 75 is conical in shape, it functions as an equallizer. Thus, the equallizer is not needed.

As shown in FIG. 7, the vibrating plate 96 is in the shape of upward cone. The base block body 65 has a flat lower surface. When the sound-wave from the vibrating plate 96 is transmitted through the space between the base block and the vibrating plate 96, the sound equallizer can be omitted. The shape of the vibrating plate 96 functions as a sound equallizer, also in this case. A sound equallizer is not needed in a sound path.

Further in the above embodiment, the height of the cylindrical members 23 and 24 is larger than that of the vibratory parts-feeder 22. It may be higher or lower. When it is higher, a suitable construction may be added for discharging parts outwards from the bowl 2 of the vibratory parts-feeder 22.

Further in the above embodiment, although the construction of the inner wall of the close space 92, 71 or 91 has not been mentioned, a sound absorbing material such as felt may be attached to the inner wall for preventing reverberation or resonance phenomenon.

Further, in the above vibratory parts-feeder apparatus 60 of FIG. 6, the gap 78 is formed between the upper end portion of the inner cover 64 and the lower end 62a of the bowl 62. Thus, the closed space 77 is formed inside of the inner cover 64. A sound absorbing material may be adhered to the inner wall so as to improve the enclosed condition. Or flexible rubber may be packed in the gap 78 between the lower end portion of bowl 62 and the upper end portion 60a of the inner cover 64. Thus, the enclosed condition can be ideally obtained.

Further in the above embodiment, the loud speaker 72 or the actuator 93 may be turned over. In this case, the same effect as the above embodiment can be obtained. When the vibrating plate of the sound-wave generator is turned over, the inverted conical is fixed to the center of the base block 65, facing to the vibrating plate 96. Thus, the sound-wave can be prevented from transmitting in the inverse direction.

In FIG. 7, the shape of the opening 65a has not been described, but it is preferable that it is annular. In this case, a connecting member may be arranged between the outer end of the base block 65 and the marginal portion of the bowl 65a so as to prevent the transmission of the sound-wave.

When the sound-wave length of the noise is sufficiently long in comparison with an outer diameter of the bowl 62, the height of the outer cover 71 may be lower than that of the bowl 62. In the third embodiment, the omission of the outer cover 71 is permissible. And when the wave length of the noise is short in comparison with the outer diameter of the bowl 62, the height of the outer cover 71 is made higher than the level of the bowl 62. The upper end of the cover 71 is bent inward in the radial direction and so the opening area of the gap S as the noise cancelling sound-wave radiating portion may be smaller.

The shape of the gap S as the noise cancelling sound-wave generator is circular in accordance with the shape of the bowl 62. When the wave length of the sounds noise cancelling sound-wave is sufficiently long in comparison with the diameter of the bowl 62, it may be ellipsoidal or square.

In the third or fourth embodiment, the output of the vibratory pick-up 25 is supplied to the noise cancelling sound-wave generator 29 and 100. Instead, a microphone or displacement detector may be arranged near the bowl and the output may be supplied to the noise cancelling sound wave generator 29 and 100.

FIG. 14 shows three pairs of sounds cancellers. In this sound cancelling method, error scanning method (EC-method) may be used for cancelling noise in three dimensional space. Also in the fourth embodiment, the shape of the noise cancelling sound-wave radiator may be shaped as the opening of the trumpet and flute. Thus the good noise cancelling effect can be obtained.

In FIG. 5, the vibratory pick-up 25 is attached to the movable part of the vibratory parts-feeder. An output is amplified by the amplifier 52 and it is converted to the analog and digital value by the A/D convertor 53. The output of the A/D convertor is supplied to a digital filter 54. Thus the phase is shifted. Instead an output terminal is connected to the electro-magnet coil of the electro-magnet of the vibratory parts-feeder for leading out the drive current. The leading out current is supplied to the amplifier 52. The vibratory parts-feeder is driven by the drive current of the frequency which is nearly equal to the resonant frequency of the vibratory system of the vibratory parts-feeder. The force is proportional to the square of the drive current. The phase difference between the force and amplitude is equal to $\pi/2$. Accordingly the signal is shifted in advance or in lag by a phase of $\pi/2$ by the digital filter 54. The vibrating plate of the loud speaker 27 is vibrated in the face difference of 180 degree from the vibration of the vibratory parts-feeder.

Figure 21:
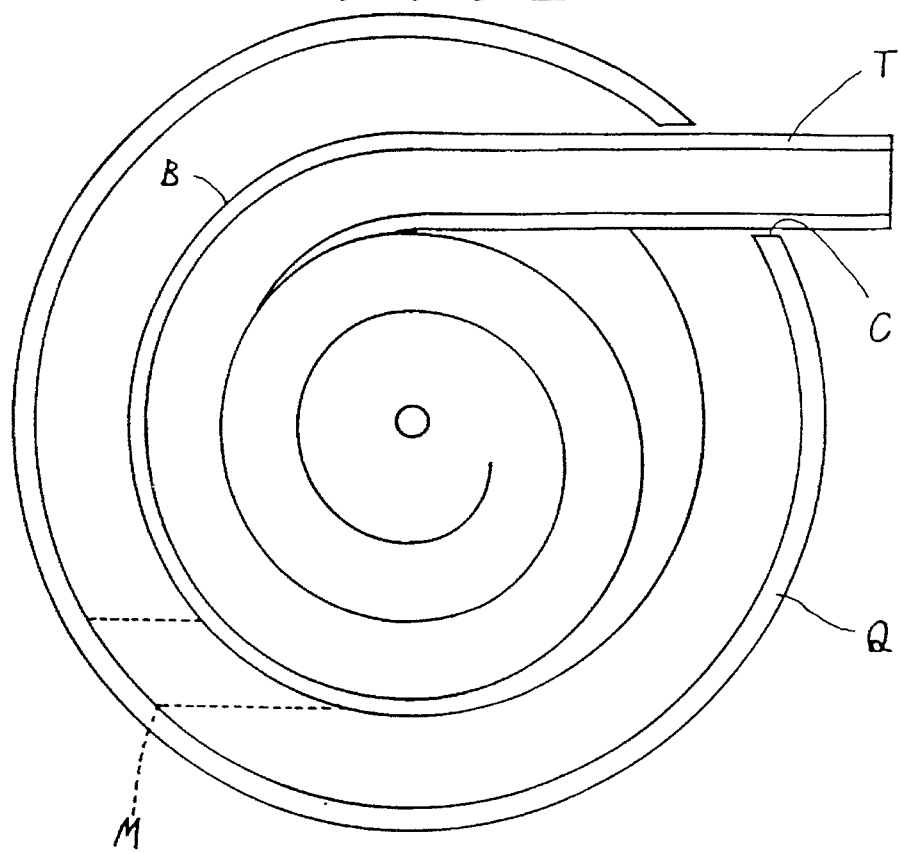
FIG. 21 is a plan view for showing a track portion leading out parts from the vibratory parts-feeder.
Figure 22:
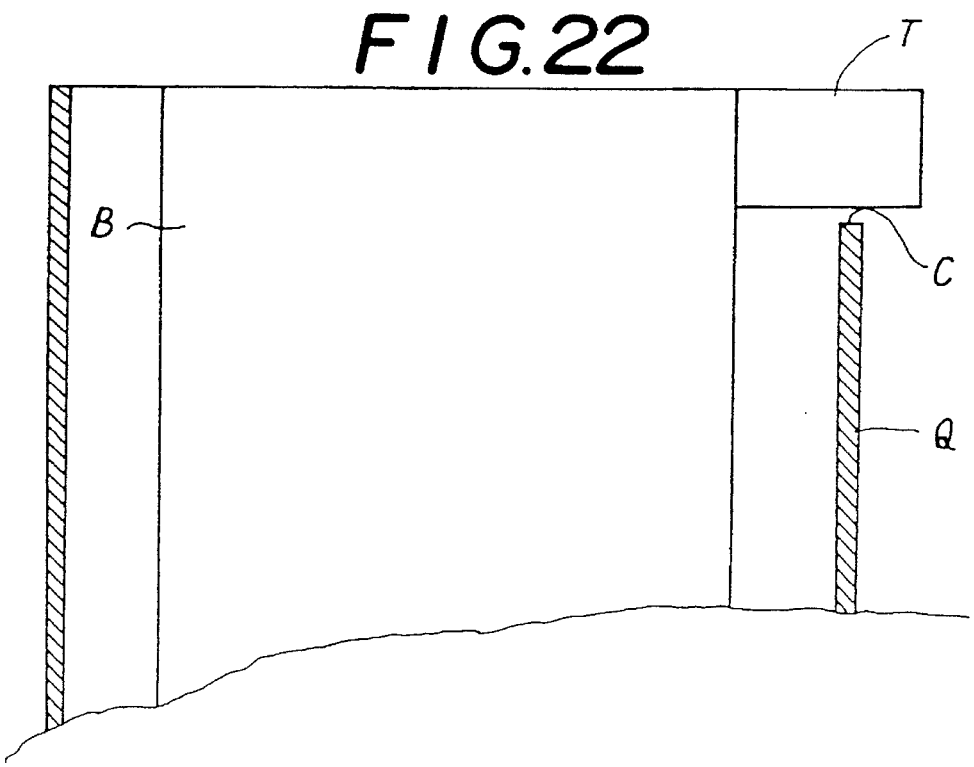
FIG. 22 is a partially broken-away side view of the apparatus of FIG. 21.

Further in these embodiment, the bowl of the vibratory parts-feeder is torsionally vibrated in the well-known manner and the parts are transported along the spiral track in the surface of the bowl. As shown in FIG. 21, a straight track portion T should be formed connected to the end of the spiral track in order to discharge the parts outward, when a cylindrical body Q is higher than or equal to the bowl B. A cut-out C is formed at a portion of the cylindrical body Q. FIG. 22 shows clearly such a cut out. The sound characteristic of the sound path may be deteriorated in comparison with an ideal condition. The noise cancelling effect can not be influenced so much. A body M as shown by the dotted line may be attached to the cylindrical body Q so as to cover a part of an upper end of the sound path. With such arrangement, it is possible that transmission characteristic is unified.

In the above embodiment, the vibration pick-up 25 is used for detecting noise generated from the vibratory parts-feeder 2. Instead, microphone or displacement detector may be used. In this case, for example, if may be arranged adjacent to the vibratory parts-feeder 2 or 32 between the cylindrical member and the vibratory parts-feeder.

Further above embodiment, the inner wall to form the enclosed space 34, 33a' has not been mentioned. A sound absorbing material such as felt may be attached to the inner wall to reduce the revebration and the harmful reflection.

In the embodiment of FIG. 18, the gap $L_1$ is formed between the top end portion of the cover 34' and the downward elogation 33a' of the bowl 33'. Thus, the closed space 40' is formed under the bowl. Similarly, the gap $L_2$' is formed between the upper end portion of the sound duct 23' and the downward elogation 33b'. The close space 40' is formed inside of the downward elongation 33a'. The leak sound from the gap is equal the noise generated from the lower side of the bowl in amplitude, but it is inverted each other in phase. Accordingly, the noise cancelling effect can be obtained. Further the sound absorbing materials may be attached to the inside wall in order to improve a close condition for the sound. In some cases, a flexible rubber may fill the space between the downward elongation 33a" of the cover 33'.

Figure 23:
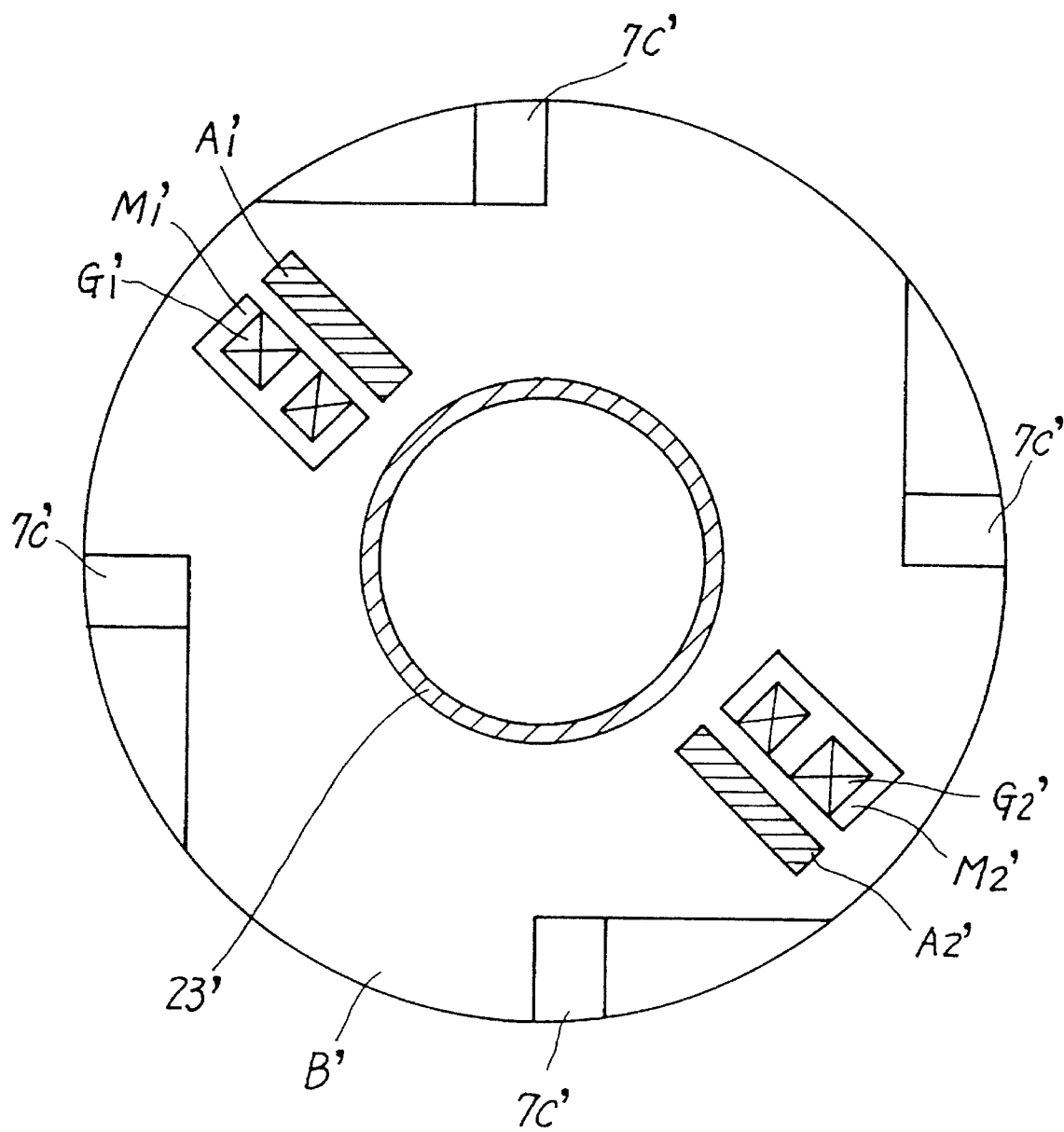
FIG. 23 is a cross-sectional plan view of the torsional vibrational force generator in the tenth embodiment.

Further in the above embodiment, the electro-magnet and the movable core annular. Instead as shown in FIG. 23, electro-magnets and movable cores may be arranged in opposition to each other on the base block body B'. The E-shaped electro-magnet $M_1$' and $M_2$' with wound coil $G_1$', $G_2$' are fixed on the base block body B' as shown in FIG. 23. A downward extending movable cores $A_1$' and $A_2$' are fixed to the bottom of the bowl so as to face the electro-magnet $M_1$ and $M_2$, spacing the gap. Thus, a torsional vibration is generated. The same effect as the above embodiment can be clearly obtained. A cutout 7c' is made at regular intervals in the base block body B. They function to fix the lower end of the leaf spring.

Further in the above embodiment, the speaker 27 may be turned over. Similarly, the actuator 93 may be turned over.

Figure 19:
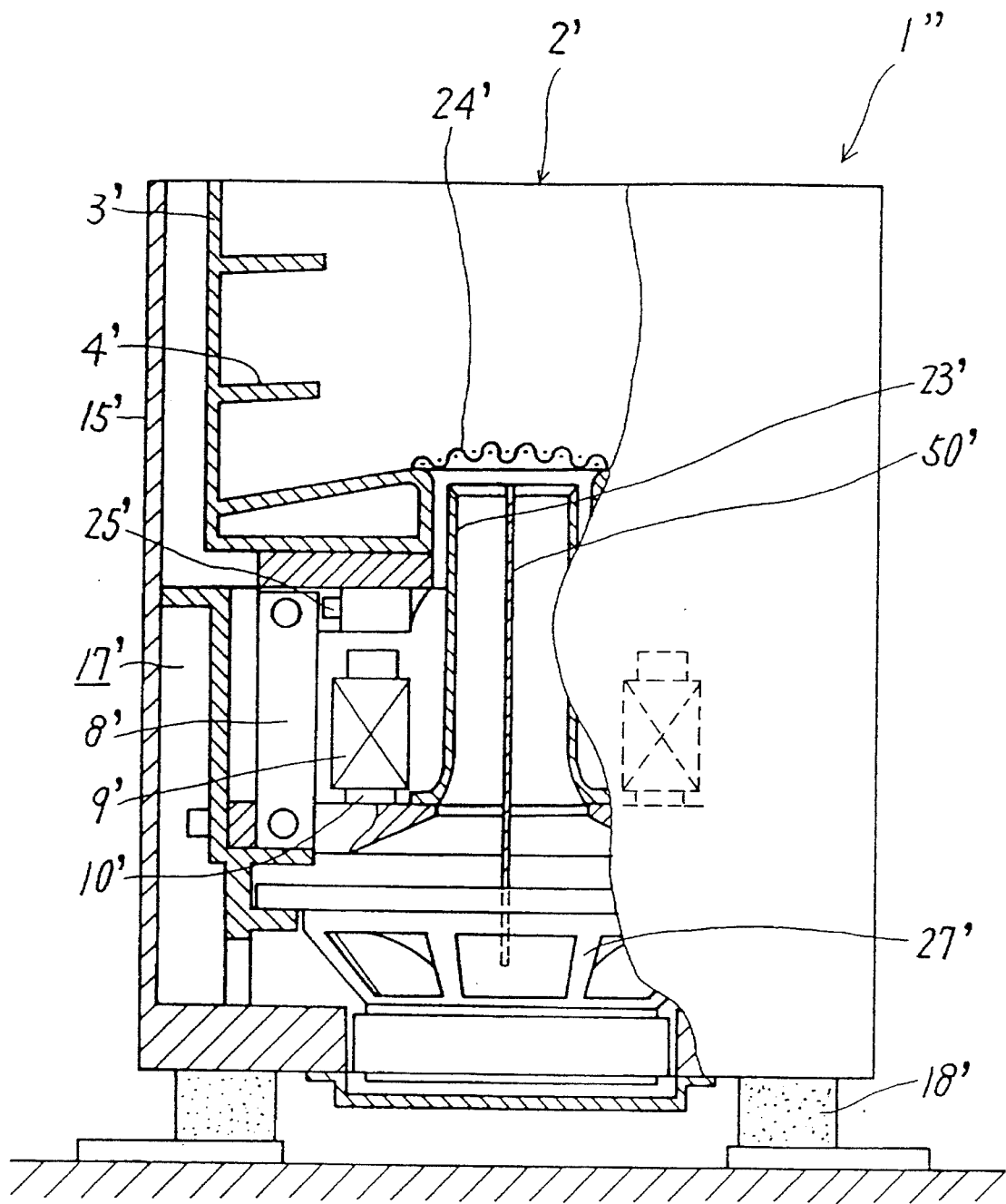
FIG. 19 shows a vibratory parts-feeder apparatus according to one variation of the tenth embodiment of this invention.

FIG. 19 shows one variation of the tenth embodiment of this invention. The parts which correspond to those in the tenth embodiment denoted by the same reference numerals, the desecription of which will be omitted. In this embodiment a partition wall 50' is arranged in the sound duct 23'. Thus, the sound-wave to cancel the noise generated from the loud speaker 27' is distributed uniformly outward. The same effect can be surely obtained.

Figure 20:
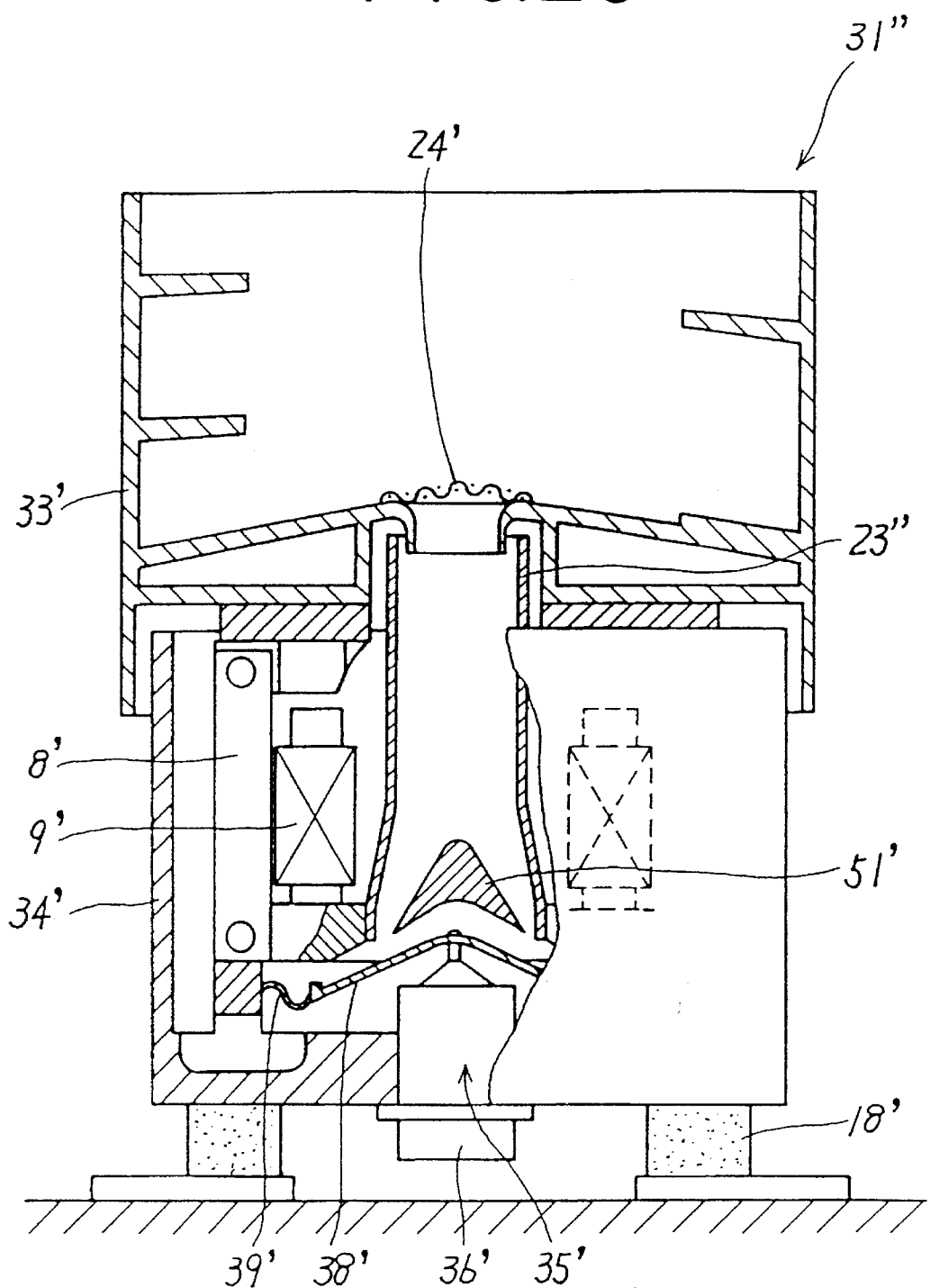
FIG. 20 is a cross-sectional view of a vibratory parts-feeder apparatus according to one variation of the eleventh embodiment of this invention.

FIG. 20 shows one variation of the eleventh embodiment. The parts which correspond to those in the eleventh embodiment, are denoted by the same reference numerals, the description of which are omitted. The sound duct 23' is differently shaped. The diameter of the lower end of the sound duct 23' is increased and nearly inverted corn shaped block 51' is arranged as a sound equallizer. Although not shown, it is so arranged that the function of the sound path is deteriorated. By such arrangement, the noise cancelling effect of the second embodiment can be more surely obtained.

What is claimed is:

1. A vibratory parts-feeder apparatus comprising:

(A) a vibratory parts-feeder;

(B) surrounding means surrounding said vibratory parts-feeder with an annular gap provided at an upper end of said surrounding means;

(C) sound-wave generating means arranged below said vibratory parts-feeder:

(D) noise detecting means arranged near said vibratory parts-feeder or attached thereto for detecting noise generating from said vibratory parts-feeder;

(E) a noise-cancelling signal generator, receiving noise detection output from said noise detecting means and thereby driving said sound-wave generating means, whereby sound-waves generating from said sound-wave generating means are transmitted outward from said annular gap at the upper end of said surrounding means.

2. A vibratory parts-feeder apparatus according to claim 1, in which said surrounding means includes, a first cylindrical body with a bottom and which surrounds said vibratory parts-feeder, and a second cylindrical body with a bottom and which surrounds said first cylindrical body, said sound-wave generating means arranged at an opening provided in said bottom of the second cylindrical body whereby sound-waves generating from said sound-wave generating means are transmitted outward from said annular gap between the upper ends of said first and second cylindrical bodies.

3. A vibratory parts-feeder apparatus according to claim 1, in which said noise-detecting means is a vibration detector attached to a movable portion of said vibratory parts-feeder.

4. A vibratory parts-feeder apparatus according to claim 1, in which said noise-detecting means is pick-up means for measuring a driving current from the drive of said vibratory parts-feeder.

5. A vibratory parts-feeder apparatus according to claim 2, in which a sound equalizer is attached to the bottom of said first cylindrical body, facing said sound-wave generating means.

6. A vibratory parts-feeder apparatus according to claim 1, in which a noise-cancelling error detecting microphone is arranged above said vibratory parts-feeder and a detecting output therefrom is supplied to said noise-cancelling signal generator.

7. A vibratory parts-feeder apparatus according to claim 1, in which said surrounding means includes a cylindrical body with a bottom and which surrounds said vibratory parts feeder, said sound-wave generating means arranged at an opening provided in said bottom of the cylindrical body, sound-waves generating from said sound-wave generating means being transmitted outward from said annular gap provided between the upper end of said vibratory parts-feeder and the upper end of said cylindrical body.

8. A vibratory parts-feeder apparatus according to claim 7, in which a sound equalizer is attached to a bottom portion of said vibratory parts-feeder, facing said sound-generating means.

9. A vibratory parts-feeder apparatus according to claim 1, in which said vibratory parts-feeder comprises;

(a) a bowl in which a spiral track is formed;
(b) a base block which is arranged under said bowl;
(c) an electro-magnet with a wound coil and fixed to said base block; and
(d) spring means combining said bowl and said base block, said surrounding means including:

(A) a cylindrical cover concentrically surrounding a torsional vibratory force generator which includes said spring means and said electro-magnet, and an annular gap being provided between the upper end of said cylindrical cover and a lower end of said bowl; and (B) a cylindrical body with a bottom and concentrically surrounding said vibratory parts-feeder, said sound-wave generating means arranged on the bottom of said cylindrical body, a close space formed between the bottom of said bowl and a vibrating part of said sound-wave generating means and communicating only with said annular gap, an annular space formed between said cylindrical body and outer surfaces of said bowl and said cylindrical cover, an opening formed between lower ends of said cylindrical body and said cylindrical cover through which the space facing to said vibratory part of the sound-wave generating means communicates with said annular space such that noise cancelling sound-waves are transmitted through an annular sound channel space outward from said sound-wave generating means.

10. A vibratory parts-feeder apparatus according to claim 1, in which said vibratory parts-feeder comprises:
 (a) a bowl in which a spiral track is formed;
 (b) a base block which is arranged under said bowl;
 (c) an electro-magnet with a wound coil and fixed to said base block: and
 (d) spring means combining said bowl and said base block, said surrounding means including:
 (A) a cylindrical cover concentrically surrounding a torsional vibratory force generator which includes said spring means and said electro-magnet, an annular gap being provided between an upper end of said cylindrical cover and a lower end of said bowl;
 (B) a cylindrical body with a bottom and concentrically surrounding said vibratory parts-feeder with said sound-wave generating means arranged on the bottom of said cylindrical body, a horizontal annular plate integrally formed with an upper end of said cylindrical cover so as to form a close annular space between said cylindrical body and said cylindrical cover and communicating through an opening formed between a lower end portion of said cylindrical cover and the vibrating portion of said sound-wave generating means whereby an annular space is formed between said cylindrical body and an outer surface of said bowl such that noise cancelling sound-waves are transmitted through said annular space outward from said sound-wave generating means.

11. A vibratory parts-feeder apparatus according to claim 1, in which said vibratory parts-feeder comprises;
 (a) a bowl in which a spiral track is formed:
 (b) a base block which is arranged under said bowl;
 (c) an electro-magnet with a wound coil and fixed to said base block; and
 (d) spring means combining said bowl and said base block, said surrounding means including:
 (A) a first cylindrical member surrounding a torsional vibratory force generator which includes said spring means and said electro-magnet fixed to said base block;
 (B) a second cylindrical member with a bottom and concentrically surrounding said first cylindrical member; a support disk supporting said vibratory parts-feeder arranged with a spacing gap from the inner surface of said second cylindrical member, said sound-wave generator means arranged at a central opening provided in said support disk spring means for vibration absorption support of said support disk on said bottom of said second cylindrical member, and noise cancelling sound-waves are transmitted through said annular space formed between said first cylindrical member and second cylindrical member outward from said sound-wave generating means.

12. A vibratory parts-feeder apparatus according to claim 11, in which amplitude of said movable portion is controlled to a predetermined value by a constant amplitude controller receiving the output of said vibration detector.

13. A vibratory parts-feeder apparatus according to claim 11, in which a sound equalizer is attached to a lower surface to said vibratory parts-feeder, facing said sound generating means.

14. A vibratory parts-feeder apparatus according to claim 11, in which a closed casing is fixed to a lower side of the support disk so as to surround the lower side of a vibrating part of said sound-wave generating means.

15. A vibratory parts-feeder apparatus according to claim 11, in which elastomeric material is packed between the space between said support disk and said second cylindrical member.

16. A vibratory parts-feeder apparatus according to claim 11, in which the upper end of second cylindrical member is bent outwardly in the radial direction of said bowl.

17. A vibratory parts-feeder apparatus according to claim 11, in which said noise canceling error detecting microphone is unidirectional and arranged to face said vibratory parts-feeder.

18. A vibratory parts-feeder apparatus according to claim 11, in which said annular space between said first cylindrical member and second cylindrical member is partitioned by partition walls of a number according to the wave-length of the sound-wave generated by said sound-wave generating means, and said sound-wave generating means arranged at a bottom portion of the partition of the annular space.

19. A vibratory parts-feeder apparatus according to claim 18, in which noise cancelling error detecting microphones are arranged above said partitioned annular spaces, respectively.

20. A vibratory parts-feeder apparatus comprising;
 (A) a vibratory parts-feeder comprising: p2 (a) a bowl in which a spiral track is formed;
 (b) a base block which is arranged under said bowl;
 (c) an electro-magnet with a wound coil and fixed to said base block; and
 (d) spring means combining said bowl and said base block;
 (B) sound-wave generating means arranged at a first opening made in a center of said base block;
 (C) a sound duct fixed at a margin of the first opening of said base block and extending upwards and facing at its upper end to a second opening made in a center of the bottom of said bowl;
 (D) noise detecting means arranged near said vibratory parts-feeder or attached thereto for detecting noise generating from said vibratory parts-feeder, and
 (E) a noise-cancelling signal generator, receiving the detecting output of said noise detecting means and driving said sound-wave generating means whereby sound-waves generating from said sound-wave generating means are transmitted outward through said sound duct.

21. A vibratory parts-feeder apparatus according to claim 20, in which a protecting net is fixed to the margin of said second opening so as to cover the latter.

22. A vibratory parts-feeder apparatus according to claim 20, in which a first cylindrical member surrounds a torsional vibration generator which includes said electro-magnet and spring means and is fixed to said base block, a second cylindrical member with bottom is arranged concentrically with said first cylindrical member, a horizontal and outward flange portion is formed integrally with the upper end of said first cylindrical member so as to form a closed annular space between said first and second cylindrical members, said closed annular space communicating only through an opening formed at a lower end portion of said first cylindrical member with the lower surface of the vibratory portion of said sound-wave generating means.

23. A vibratory parts-feeder apparatus according to claim 20, in which a sound equalizer is arranged in said sound duct.

24. A vibratory parts-feeder apparatus according to claim 20, in which said sound duct is partitioned by one or plural vertical partition walls.

25. A vibratory parts-feeder apparatus according to anyone of claims 20, in which the margin of said second opening is rounded.

26. A vibratory parts-feeder apparatus according to claim 20, in which a third cylindrical member surrounds a torsional vibration generator which includes said electro-magnet and spring means, and is fixed to said base block, an annular gap being formed between an upper end of said third cylindrical member and an elongation of the peripheral wall of said bowl, and the lower surface of the vibratory portion of said sound-wave generating means communicating with said annular gap through a cut-out made in said base block.

* * * * *